US009694844B2

(12) United States Patent
Maeda et al.

(10) Patent No.: US 9,694,844 B2
(45) Date of Patent: Jul. 4, 2017

(54) ELECTRIC POWER STEERING SYSTEM

(71) Applicant: JTEKT CORPORATION, Osaka-shi, Osaka (JP)

(72) Inventors: Shingo Maeda, Okazaki (JP); Terutaka Tamaizumi, Okazaki (JP); Hidenori Itamoto, Tajimi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/929,815

(22) Filed: Nov. 2, 2015

(65) Prior Publication Data

US 2016/0121923 A1 May 5, 2016

(30) Foreign Application Priority Data

Nov. 4, 2014 (JP) ................................ 2014-224594

(51) Int. Cl.
*B62D 5/04* (2006.01)
*B62D 6/04* (2006.01)

(52) U.S. Cl.
CPC ......... *B62D 5/0463* (2013.01); *B62D 5/0481* (2013.01); *B62D 6/04* (2013.01)

(58) Field of Classification Search
CPC ............... B62D 6/04; B62D 5/08; B62D 5/46
USPC .............. 701/41, 42, 43; 180/443, 444, 446; 318/432
See application file for complete search history.

(56) References Cited

U.S. PATENT DOCUMENTS 6,360,153 B1 * 3/2002 Shinmura .............. B60K 17/16 180/233
2003/0120407 A1 * 6/2003 Itoh ...................... B62D 5/0484 701/43
2011/0015828 A1 * 1/2011 Shimizu ............... B62D 5/0481 701/43
(Continued)

FOREIGN PATENT DOCUMENTS

DE 100 43 914 A1 5/2001
EP 2 803 557 A2 11/2014
(Continued)

OTHER PUBLICATIONS

Jun. 23, 2016 Extended Search Report issued in European Patent Application No. 15192714.2.

*Primary Examiner* — Thomas G Black
*Assistant Examiner* — Wae Louie
(74) *Attorney, Agent, or Firm* — Oliff PLC

(57) ABSTRACT

An electric power steering system includes a control unit configured to: compute an assist control amount (current amount), based on multiple kinds of state quantities indicating a steering state; control a motor based on the assist control amount, the motor being a source of assist force to be applied to a steering system of a vehicle; individually set, for the respective state quantities, limiting values that limit a variation range of the assist control amount, based on the respective state quantities used to compute the assist control amount; limit a value of the assist control amount using the limiting values; acquire a command value generated by a host control unit to change the assist control amount; and take the command value into account in setting of at least one of the limiting values, when executing control of the motor based on the assist control amount that reflects the command value.

5 Claims, 17 Drawing Sheets

(56) References Cited

U.S. PATENT DOCUMENTS

2012/0145472 A1* 6/2012 Imamura ................ B62D 5/046 180/446
2012/0185132 A1* 7/2012 Kezobo ................ B62D 5/0472 701/41
2012/0205186 A1* 8/2012 Niimi ....................... B62D 5/04 180/446
2012/0299517 A1* 11/2012 Niimi ................... B62D 5/0481 318/432
2013/0261894 A1* 10/2013 Kojima ................ B62D 5/0463 701/41
2014/0005894 A1* 1/2014 Aoki .................... B62D 5/0484 701/43
2014/0076653 A1* 3/2014 Ochiai ................. B62D 5/0403 180/444
2014/0180544 A1* 6/2014 Itamoto .................. B62D 5/049 701/41
2014/0343789 A1* 11/2014 Maeda ................. B62D 5/0457 701/41
2015/0008066 A1* 1/2015 Sugiyama ............ B62D 5/0475 180/443
2015/0088383 A1* 3/2015 Kodato .................. B62D 6/007 701/41
2015/0203148 A1* 7/2015 Kuramitsu ........... B62D 5/0463 701/41
2015/0232120 A1* 8/2015 Aono ................... B62D 5/0463 701/42
2015/0375780 A1* 12/2015 Chai ...................... B62D 6/008 701/41
2016/0059886 A1* 3/2016 Tsunoda ............... B62D 5/0484 701/43
2016/0107679 A1* 4/2016 Kimura ................ B62D 5/0463 701/42
2016/0121923 A1* 5/2016 Maeda ................. B62D 5/0481 701/41
2016/0137221 A1* 5/2016 Mose ................... B62D 5/0463 701/41
2016/0167701 A1* 6/2016 Sone .................... B62D 5/0463 701/43

FOREIGN PATENT DOCUMENTS

EP 2 998 198 A1 3/2016
JP 2010-155598 A 7/2010

* cited by examiner

ELECTRIC POWER STEERING SYSTEM

INCORPORATION BY REFERENCE

The disclosure of Japanese Patent Application No. 2014-224594 filed on Nov. 4, 2014 including the specification, drawings and abstract is incorporated herein by reference in its entirety.

BACKGROUND OF THE INVENTION

1. Field of the Invention

The invention relates to an electric power steering system.

2. Description of Related Art

As described in, for example, Japanese Patent Application Publication No. 2010-155598 (JP 2010-155598 A), an electric power steering system (hereinafter, referred to as "EPS") assists a driver in performing a steering operation by applying torque generated by a motor to a steering mechanism of a vehicle. The EPS executes feedback control of motor currents to cause the motor to generate an appropriate assist force based on at least a steering torque. That is, the EPS adjusts a voltage to be applied to the motor by adjusting a duty ratio through pulse width modulation (PWM) such that the difference between an assist current command value, computed based on at least the steering torque, and a detected motor current value is decreased.

Because an EPS is required to ensure a higher level of safety, the EPS in JP 2010-155598 A employs the following configuration. That is, the EPS limits the assist current command value to a value within a range between prescribed upper and lower limits, inclusive, when the sign (positive sign or negative sign) of the steering torque and the sign (positive sign or negative sign) of the assist current command value coincide with each other. On the other hand, when the steering torque and the assist current command value are opposite in sign to each other, the EPS determines that an abnormality has occurred in the assist control computation and limits the assist current command value to zero.

However, the EPS described in JP 2010-155598 A leaves room for improvement in the following respect. That is, the EPS described in JP 2010-155598 A is not able to limit the assist current command value to zero when the steering torque is within a range of small values (a range centered at zero and between prescribed positive and negative values, inclusive). Generally, the assist current command value is generated by adding a compensation amount for adjusting the steering behavior, to a basic component based on the steering torque. However, the sign of the compensation amount does not coincide with the sign of the steering torque in some cases. When the steering torque is large, even if the sign of the compensation amount does not coincide with the sign of the steering torque, the compensation amount is cancelled out by the basic component and thus the sign of the assist current command value itself coincides with the sign of the steering torque. Therefore, the non-coincidence between the sign of the assist current command value and the sign of the steering torque may be regarded as occurrence of an abnormality in the assist control computation. However, when the steering torque is within the range of small values, the basic component is small and the ratio of the compensation amount to the assist current command value is high. Therefore, even if there is no abnormality in the assist control computation, there is a possibility that the sign of the assist current command value and the sign of the steering torque will not coincide with each other. In this case, if the assist current command value is limited to zero, there is a possibility that the steering behavior will not be adjusted. Therefore, when the steering torque is within the range of small values, the EPS described in JP 2010-155598 A does not limit the assist current command value to zero, but limits the assist current command value within a range having a margin where the compensation amount is not limited. Therefore, even if an abnormal assist current command value is erroneously computed for some reason, the assist current command value is not strictly limited when the steering torque is within the range of small values. Thus, an unexpected assist force may be applied to the steering mechanism and self-assist may occur in some cases.

SUMMARY OF THE INVENTION

The invention provides an electric power steering system configured to apply more appropriate assist force to a steering system.

An aspect of the invention relates to an electric power steering system including a control unit configured to: i) compute an assist control amount that is a current amount, based on multiple kinds of state quantities indicating a steering state; ii) control a motor based on the assist control amount, the motor being a source of assist force to be applied to a steering system of a vehicle; iii) individually set, for the respective state quantities, limiting values that limit a variation range of the assist control amount, based on the respective state quantities used to compute the assist control amount; iv) limit a value of the assist control amount using the limiting values; v) acquire a command value generated by a host control unit to change the assist control amount; and vi) take the command value into account in setting of at least one of the limiting values, when executing control of the motor based on the assist control amount that reflects the command value.

In the electric power steering system according to the above aspect: the command value may be a torque command value; the control unit may include a first converter configured to convert the torque command value to a current amount; and the control unit may be configured to add the current amount obtained through conversion executed by the first converter, to the computed assist control amount, and configured to use a value obtained by adding the torque command value to a steering torque that is one of the multiple kinds of state quantities, when setting the limiting values based on the steering torque.

In the electric power steering system according to the above aspect, the control unit may be configured to compute a basic component of the assist control amount and at least one compensation amount for the basic component, and configured to compute the assist control amount by adding together the basic component and the at least one compensation amount. In this case, the command value may be a gain by which the compensation amount is multiplied, and the control unit may multiply, by the gain, each of the limiting values set based on the state quantity that is used as a base for computation of the compensation amount to be multiplied by the gain.

In the electric power steering system according to the above aspect, the control unit may be configured to generate each of final limiting values for the assist control amount by adding together multiple kinds of the limiting values individually set for the respective state quantities, and configured to limit the value of the assist control amount using the final limiting values. In this case, the command value may be an additional current command value to be added to the computed assist control amount, and the control unit may add the additional current command value to each of the final limiting values.

In the electric power steering system according to the above aspect: the command value may be a steering angle command value; the control unit may include a second converter configured to convert the steering angle command value to a current amount; and the control unit may be configured to add the current amount obtained through conversion executed by the second converter, to the computed assist control amount, and configured to use a value obtained by adding the steering angle command value to a steering angle that is one of the multiple kinds of state quantities, when setting the limiting values based on the steering angle.

With the electric power steering system according to the aspect of the invention, it is possible to apply more appropriate assist force to the steering system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
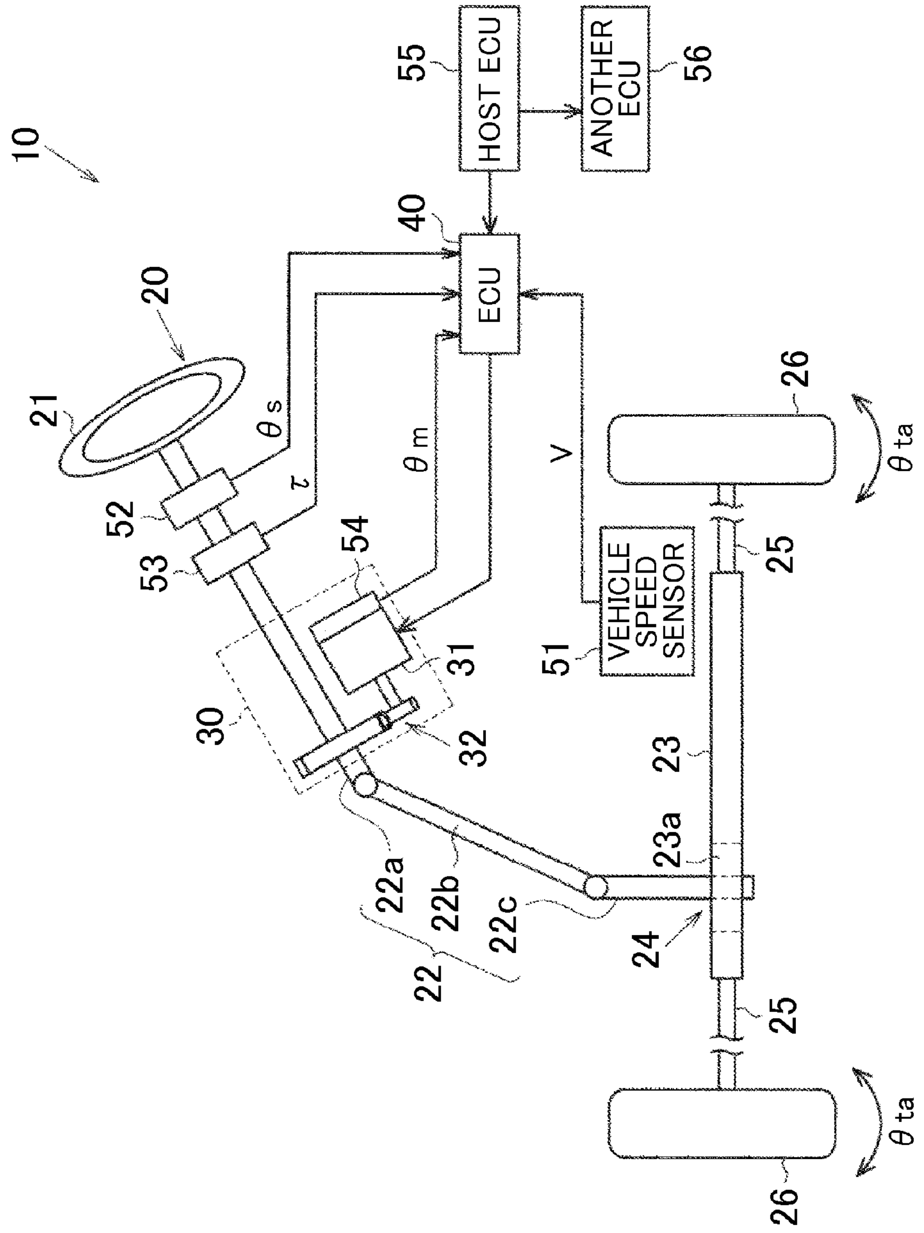
FIG. 1 is a schematic diagram illustrating the configuration of an electric power steering system according to a first embodiment of the invention.

Hereinafter, an electric power steering system according to a first embodiment of the invention will be described with reference to the accompanying drawings. First, the overall configuration of an electric power steering system 10 will be described. As illustrated in FIG. 1, the electric power steering system 10 includes a steering mechanism 20, a steering assist mechanism 30, and an electronic control unit 40 (hereinafter, referred to as "ECU 40"). The steering mechanism 20 is configured to steer (i.e., turn) right and left steered wheels (i.e., turning wheels) 26 in response to a steering operation performed by a driver. The steering assist mechanism 30 is configured to assist the driver in performing a steering operation. The ECU 40 is configured to control the operation of the steering assist mechanism 30.

The steering mechanism 20 includes a steering wheel 21 and a steering shaft 22. The steering wheel 21 is operated by the driver. The steering shaft 22 rotates together with the steering wheel 21. A column shaft 22*a*, an intermediate shaft 22*b*, and a pinion shaft 22*c* constitute the steering shaft 22. The column shaft 22*a* is coupled to the center of the steering wheel 21. The intermediate shaft 22*b* is coupled to a lower end portion of the column shaft 22*a*. The pinion shaft 22*c* is coupled to a lower end portion of the intermediate shaft 22*b*. A lower end portion of the pinion shaft 2*c* is in mesh with a rack shaft 23. More specifically, the lower end portion of the pinion shaft 2*c* is in mesh with a toothed portion 23*a* of the rack shaft 23, where rack teeth are formed. The rack shaft 23 extends in such a direction that the rack shaft 23 intersects with the pinion shaft 22*c*. With this configuration, the rotary motion of the steering shaft 22 is converted into a linear reciprocating motion of the rack shaft 23 by a rack-and-pinion mechanism 24. The pinion shaft 22*c* and the rack shaft 23 constitute the rack-and-pinion mechanism 24. The linear reciprocating motion is transmitted to the right and left steered wheels 26 via tie-rods 25 coupled to the respective ends of the rack shaft 23. As a result, a steered angle θta of the steered wheels 26 is adjusted.

The steering assist mechanism 30 includes a motor 31 that is a source of steering assist force. The motor 31 may be, for example, a brushless motor. The motor 31 is connected to the column shaft 22*a* via a speed reducer 32. The speed reducer 32 reduces the speed of rotation output from the motor 31, and transmits the rotation with a reduced speed to the column shaft 22*a*. That is, the torque generated by the motor 31 is applied, as a steering assist force (assist force), to the steering shaft 22, so that the driver is assisted in performing a steering operation.

The ECU 40 acquires results of detection carried out by various sensors mounted in a vehicle as the information indicating a command issued by the driver or a travelling state. Then, the ECU 40 controls the motor 31 based on the various kinds of acquired information.

Examples of the sensors include a vehicle speed sensor 51, a steering sensor 52, a torque sensor 53, and a rotation angle sensor 54. The vehicle speed sensor 51 detects a vehicle speed V (a travelling speed of the vehicle). The steering sensor 52 is a magnetic rotation angle sensor disposed on the column shaft 22*a*, and detects a steering angle θs. The torque sensor 53 is disposed on the column shaft 22*a*, and detects a steering torque τ. The rotation angle sensor 54 is provided on the motor 31, and detects a rotation angle θm of the motor 31.

The ECU 40 computes a target assist force, based on the vehicle speed V, the steering angle θs, the steering torque τ, and the rotation angle θm. The ECU 40 supplies the motor 31 with driving electric power for causing the steering assist mechanism 30 to generate the target assist force.

In the vehicle, the ECU 40 and an electronic control unit 56 (hereinafter, referred to as "ECU 56") of another in-vehicle system may execute cooperative control. Note that "cooperative control" means a technique of controlling the behavior of the vehicle under mutual cooperation between electronic control units of two or more kinds of in-vehicle systems. In the vehicle, lane keeping assist control for assisting the vehicle to travel along lanes may be executed by assisting the driver in performing a steering operation. The vehicle is provided with a host electronic control unit 55 (hereinafter, referred to as "host ECU 55") configured to execute integrated control over the electronic control units of the various kinds of in-vehicle systems. The host ECU 55 determines the optimal control method based on the present vehicle state, and commands the electronic control units to execute individual controls based on the determined optimal control method. The host ECU 55 generates a correction torque command value τ* as a command value for the ECU 40. The correction torque command value τ* is used to execute a steering assist for promoting an emergency avoidance operation or to cancel out an abnormal rotation moment that acts on the vehicle. The ECU 40 takes the command from the host ECU 55 into account to control the motor 31.

Figure 2:
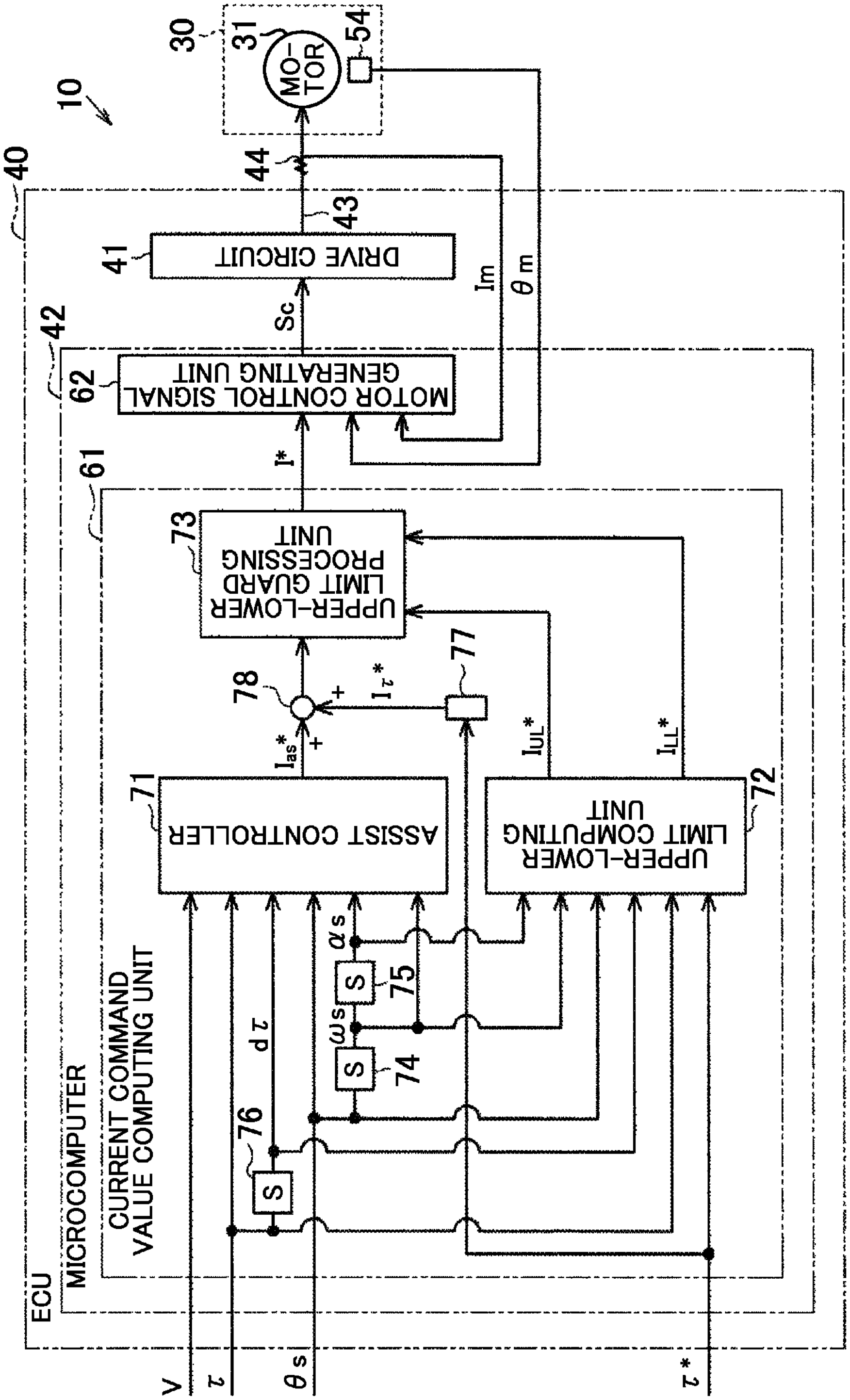
FIG. 2 is a control block diagram of the electric power steering system according to the first embodiment.

Next, the hardware configuration of the ECU 40 will be described below. As illustrated in FIG. 2, the ECU 40 includes a drive circuit (inverter circuit) 41 and a microcomputer 42.

The drive circuit 41 converts direct-current (DC) power supplied from a direct-current (DC) power source, such as a battery, into three-phase alternating-current (AC) power, based on a motor control signal Sc (PWM drive signal) generated by the microcomputer 42. The three-phase AC power obtained through the conversion is supplied to the motor 31 via power supply lines 43 for three phases. The power supply lines 43 for the three phases are provided with current sensors 44. The current sensors 44 detect actual current values Im, which are actual values of currents flowing through the power supply lines 43 for the three-phases. In FIG. 2, for convenience of description, the power supply lines 43 for the three phases are collectively illustrated as one power supply line 43, and the current sensors 44 for the three-phases are collectively illustrated as one current sensor 44.

The microcomputer 42 acquires the results of detection carried out by the vehicle speed sensor 51, the steering sensor 52, the torque sensor 53, the rotation angle sensor 54, and the current sensors 44 with a prescribed sampling period. The microcomputer 42 generates the motor control signal Sc based on the acquired detection results, that is, the vehicle speed V, the steering angle θs, the steering torque τ, the rotation angle θm, and the actual current values Im.

Next, the functional configuration of the microcomputer 42 will be described below. The microcomputer 42 includes various computation processing units that are realized by executing various control programs stored in memory devices (not illustrated).

As illustrated in FIG. 2, the microcomputer 42 includes a current command value computing unit 61 and a motor control signal generating unit 62 as the computation processing units. The current command value computing unit 61 computes a current command value I* based on the steering torque τ, the vehicle speed V, and the steering angle θs. The current command value I* is a command value indicating a current that should be supplied to the motor 31. More specifically, the current command value I* contains a q-axis current command value and a d-axis current command value in a dq coordinate system. In the present embodiment, the d-axis current command value is set to zero. The dq coordinate system is a rotating coordinate system that follows the rotation angle θm of the motor 31. The motor control signal generating unit 62 converts the three-phase current values Im for the motor 31 into two-phase vector components, that is, a d-axis current value and a q-axis current value in the dq coordinate system, using the rotation angle θm. The motor control signal generating unit 62 computes a deviation between the d-axis current value and the d-axis current command value and a deviation between the q-axis current value and the q-axis current command value, and generates the motor control signal Sc for eliminating the deviations.

Next, the current command value computing unit 61 will be described in detail below. As illustrated in FIG. 2, the current command value computing unit 61 includes an assist controller 71, an upper-lower limit computing unit 72, and an upper-lower limit guard processing unit 73. The current command value computing unit 61 further includes three differentiators 74, 75, 76. The differentiator 74 computes a steering velocity (steering angular velocity) ωs by differentiating the steering angle θs. The differentiator 75 computes a steering angular acceleration αs by further differentiating the steering velocity ωs computed by the differentiator 74, which is on the upstream side of the differentiator 75. The differentiator 76 computes a steering torque derivative value dτ by differentiating the steering torque τ with respect to time.

The assist controller 71 computes an assist control amount $I_{as}^*$ based on the steering torque τ, the vehicle speed V, the steering angle θs, the steering velocity ωs, the steering angular acceleration αs, and the steering torque derivative value dτ. The assist control amount $I_{as}^*$ is a value of an amount of current (current value) that is supplied to the motor 31 to cause the motor 31 to generate a target assist force with an appropriate magnitude corresponding to these state quantities.

The current command value computing unit 61 includes a converter 77 and an adder 78. Upon the generation of the correction torque command value τ* by the host ECU 55, the converter 77 converts the correction torque command value τ* into a current amount $I_\tau^*$. The adder 78 generates a final assist control amount $I_{as}^*$ by adding the current amount $I_\tau^*$ obtained through conversion by the converter 77 to the assist control amount $I_{as}^*$ generated by the assist controller 71.

The upper-lower limit computing unit 72 acquires various signals to be used in the assist controller 71. In this case, the upper-lower limit computing unit 72 acquires signals indicating the steering torque $\tau$, the steering angle $\theta s$, the steering torque derivative value $d\tau$, the steering velocity $\omega s$, and the steering angular acceleration $\alpha s$. Upon the generation of the correction torque command value $\tau^*$ by the host ECU 55, the upper-lower limit computing unit 72 acquires the correction torque command value $\tau^*$. The upper-lower limit computing unit 72 computes an upper limit $I_{UL}^*$ and a lower limit $I_{LL}^*$ as limiting values for limiting the assist control amount $I_{as}^*$, based on the acquired signals $\tau$, $\theta s$, $d\tau$, $\omega s$, $\alpha s$, $\tau^*$. The upper limit $I_{UL}^*$ and the lower limit $I_{LL}^*$ are final limiting values for limiting the assist control amount $I_{as*}$.

The upper-lower limit guard processing unit 73 executes a process of limiting the assist control amount $I_{as}^*$ based on the upper limit $I_{UL}^*$ and the lower limit $I_{LL}^*$ computed by the upper-lower limit computing unit 72. That is, the upper-lower limit guard processing unit 73 compares the value of the assist control amount $I_{as}^*$ with the upper limit $I_{UL}^*$ and the lower limit $I_{LL}^*$. The upper-lower limit guard processing unit 73 limits the assist control amount $I_{as}^*$ to the upper limit $I_{UL}^*$ when the assist control amount $I_{as}^*$ is greater than the upper limit $I_{UL}^*$, and the upper-lower limit guard processing unit 73 limits the assist control amount $I_{as}^*$ to the lower limit $I_{LL}^*$ when the assist control amount $I_{as}^*$ is less than the lower limit $I_{LL}^*$. The assist control amount $I_{as}^*$ that has undergone the limiting process is used as the final current command value I*. When the assist control amount $I_{as}^*$ is within a range between the upper limit $I_{UL}^*$ and the lower limit $I_{LL}^*$, inclusive, the assist control amount $I_{as}^*$ computed by the assist controller 71 is used as the final current command value I* without any change.

Figure 3:
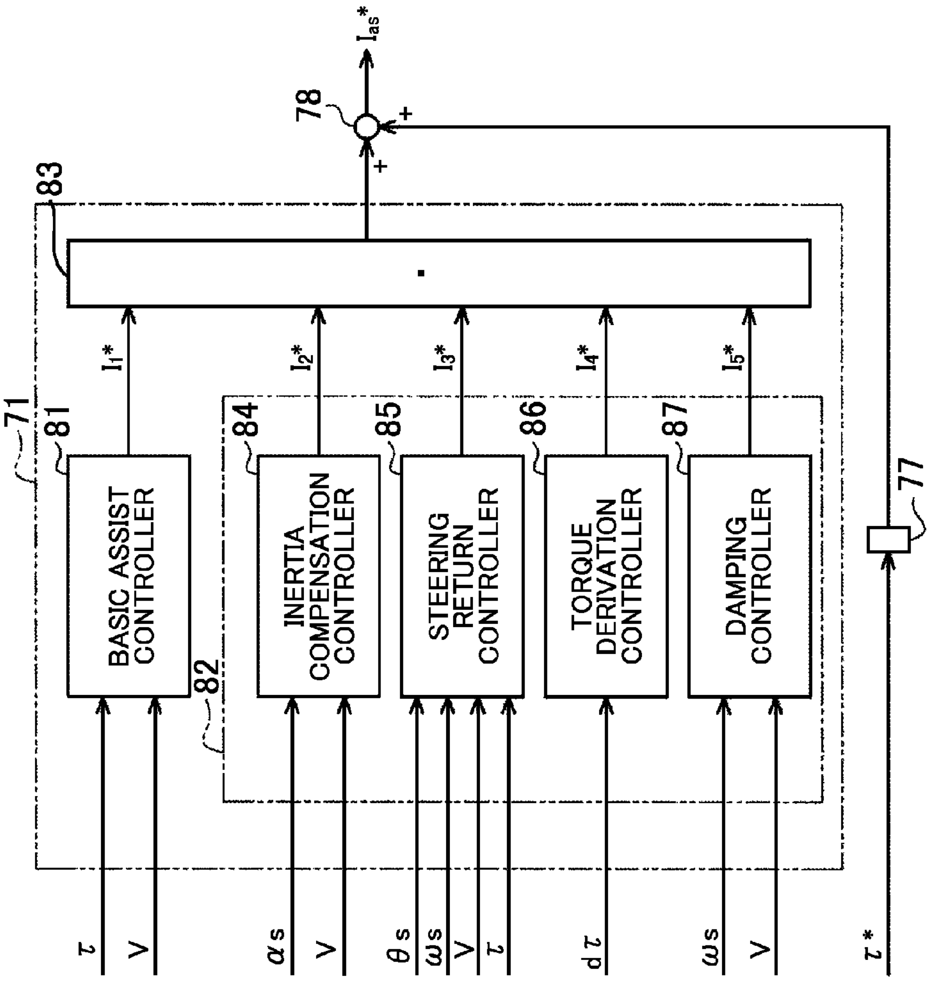
FIG. 3 is a control block diagram of an assist controller in the first embodiment.

Next, the assist controller 71 will be described in detail below. As illustrated in FIG. 3, the assist controller 71 includes a basic assist controller 81, a compensation controller 82, and an adder 83.

The basic assist controller 81 computes a basic assist control amount $I_1^*$ based on the steering torque $\tau$ and the vehicle speed V. The basic assist control amount $I_1^*$is a basic component (current value) for causing the motor 31 to generate the target assist force with an appropriate magnitude corresponding to the steering torque $\tau$ and the vehicle speed V. The basic assist controller 81 computes the basic assist control amount $I_1^*$, for example, using an assist characteristic map stored in a memory device (not illustrated) of the microcomputer 42. The assist characteristic map is a vehicle-speed-sensitive three-dimensional map for computing the basic assist control amount $I_1^*$ based on the steering torque $\tau$ and the vehicle speed V. The assist characteristic map is set such that the basic assist control amount $I_1^*$having a larger value (absolute value) is computed as the steering torque $\tau$ (absolute value) becomes larger or the vehicle speed V becomes lower.

The compensation controller 82 executes various compensation controls on the basic assist control amount $I_1^*$ to give the driver a more comfortable steering feel. The compensation controller 82 includes, for example, an inertia compensation controller 84, a steering return controller 85, a torque derivative controller 86, and a damping controller 87.

The inertia compensation controller 84 computes a compensation amount $I_2^*$ (current value) for compensating for the inertia of the motor 31 based on the steering angular acceleration $\alpha s$ and the vehicle speed V. By correcting the basic assist control amount $I_1^*$ using the compensation amount $I_2^*$, it is possible to prevent undershooting (a phenomenon in which the actual steered angle becomes smaller than the steered angle expected by the driver) at the start of a steering operation of the steering wheel 21 and overshooting (a phenomenon in which the actual steered angle becomes larger than the steered angle expected by the driver) at the end of the steering operation of the steering wheel 21.

The steering return controller 85 computes a compensation amount $I_3^*$ (current value) for compensating for return characteristics of the steering wheel 21 based on the steering torque $\tau$, the vehicle speed V, the steering angle $\theta s$, and the steering velocity $\omega s$. By correcting the basic assist control amount $I_1^*$ using the compensation amount $I_3^*$, excess or deficiency of self-aligning torque due to a road reaction force is compensated for. This is because an assist force headed in such a direction as to return the steering wheel 21 to the neutral position is generated based on the compensation amount $I_3^*$.

The torque derivative controller 86 detects a reverse input vibration component as the steering torque derivative value $d\tau$, and computes a compensation amount $I_4^*$ (current value) for compensating for disturbance such as reverse input vibration based on the detected steering torque derivative value $d\tau$. By correcting the basic assist control amount $I_1^*$ using the compensation amount $I_4^*$, disturbance such as brake vibration generated due to a braking operation is suppressed. This is because an assist force headed in such a direction as to cancel out the reverse input vibration is generated based on the compensation amount $I_4^*$.

The damping controller 87 computes a compensation amount $I_5^*$ (current value) for compensating for viscous damping of the steering system, based on the steering velocity $\omega s$ and the vehicle speed V. By correcting the basic assist control amount $I_1^*$ using the compensation amount $I_5^*$, it is possible to reduce, for example, slight and quick vibrations to be transmitted to the steering wheel 21.

The adder 83 generates the assist control amount $I_{as}^*$ by adding the compensation amount $I_2^*$, the compensation amount $I_3^*$, the compensation amount $I_4^*$, and the compensation amount $I_5^*$ to the basic assist control amount $I_1^*$, as a process of correcting the basic assist control amount $I_1^*$.

Figure 4:
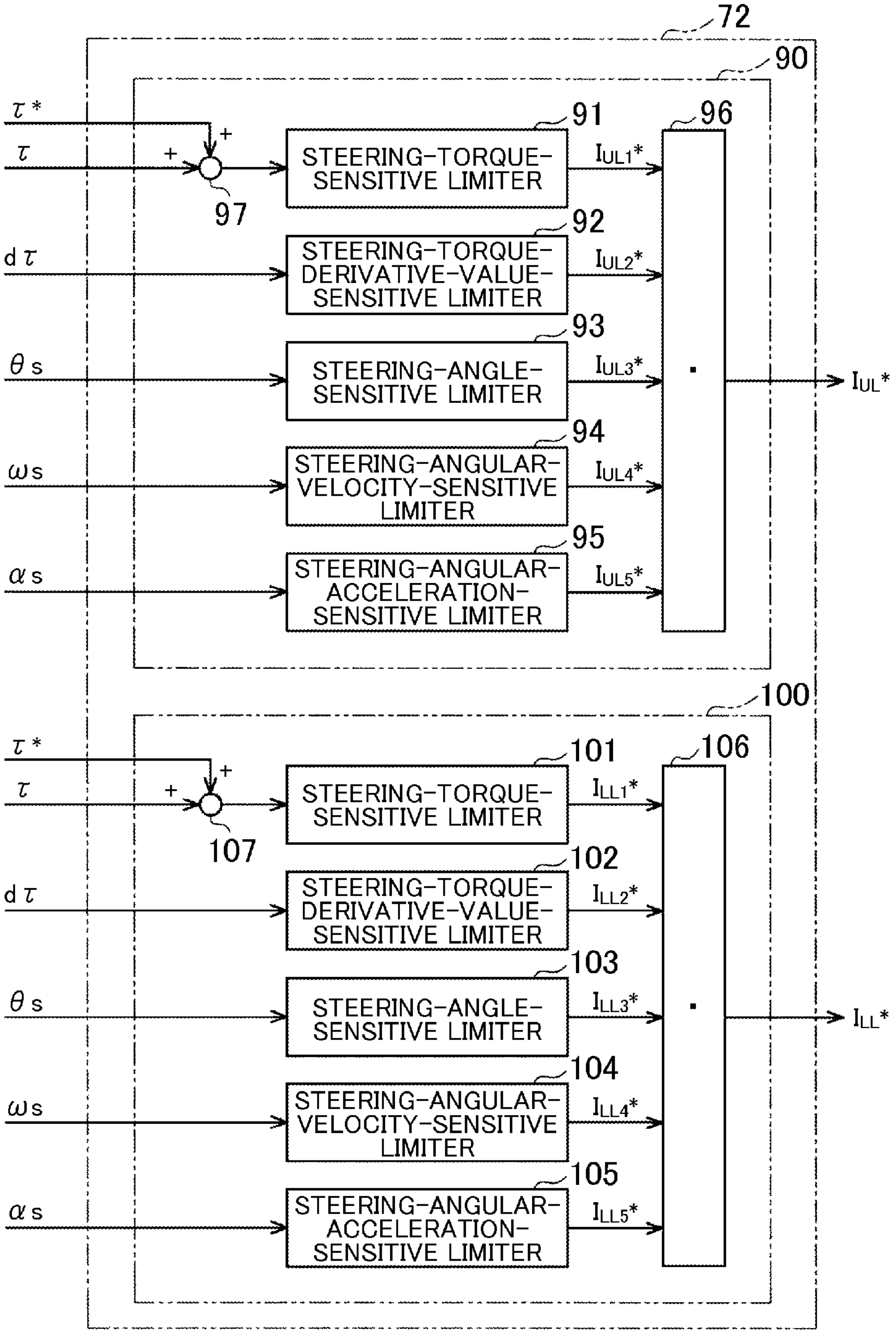
FIG. 4 is a control block diagram of an upper-lower limit computing unit in the first embodiment.

Next, the upper-lower limit computing unit 72 will be described in detail below. As illustrated in FIG. 4, the upper-lower limit computing unit 72 includes an upper limit computing unit 90 and a lower limit computing unit 100. Upon the generation of the correction torque command value $\tau^*$ by the host ECU 55, the upper limit computing unit 90 and the lower limit computing unit 100 each acquires the correction torque command value $\tau^*$.

The upper limit computing unit 90 includes a steering-torque-sensitive limiter 91, a steering-torque-derivative-value-sensitive limiter 92, a steering-angle-sensitive limiter 93, a steering-angular-velocity-sensitive limiter 94, and a steering-angular-acceleration-sensitive limiter 95. The upper limit computing unit 90 further includes two adders 96, 97.

The adder 97 adds the correction torque command value $\tau^*$ generated by the host ECU 55 to the steering torque $\tau$. When the correction torque command value $\tau^*$ is not generated by the host ECU 55, the steering torque $\tau$ detected by the torque sensor 53 is used as the final steering torque $\tau$ without any change. When the correction torque command value $\tau^*$ is generated by the host ECU 55, the value obtained by adding the correction torque command value $\tau^*$ to the steering torque $\tau$ detected by the torque sensor 53 is used as the final steering torque $\tau$.

The steering-torque-sensitive limiter 91 computes an upper limit $I_{UL1}^*$ for the assist control amount $I_{as}^*$ based on the steering torque $\tau$. When the correction torque command value $\tau^*$ is generated by the host ECU 55, the steeringtorque-sensitive limiter 91 computes the upper limit $I_{UL1}$* corresponding to the final steering torque τ obtained by adding the correction torque command value τ* to the steering torque τ detected by the torque sensor 53. The steering-torque-derivative-value-sensitive limiter 92 computes an upper limit $I_{UL2}$* for the assist control amount $I_{as}$* based on the steering torque derivative value dτ. The steering-angle-sensitive limiter 93 computes an upper limit $I_{UL3}$* for the assist control amount $I_{as}$* based on the steering angle θs. The steering-angular-velocity-sensitive limiter 94 computes an upper limit $I_{UL4}$* for the assist control amount $I_{as}$* based on the steering velocity ωs. The steering-angular-acceleration-sensitive limiter 95 computes an upper limit $I_{UL5}$* for the assist control amount $I_{as}$* based on the steering angular acceleration αs.

The adder 96 generates the upper limit $I_{UL}$* for the assist control amount $I_{as}$* by adding the five upper limits $I_{UL1}$* to $I_{UL5}$* together. When the correction torque command value τ* is generated by the host ECU 55, the correction torque command value τ*, which is a command from the host ECU 55, is taken into account in generation of the upper limit $I_{UL1}$* by the steering-torque-sensitive limiter 91. As a result, the final upper limit $I_{UL}$* generated by the adder 96 also reflects the command from the host ECU 55.

The lower limit computing unit 100 includes a steering-torque-sensitive limiter 101, a steering-torque-derivative-value-sensitive limiter 102, a steering-angle-sensitive limiter 103, a steering-angular-velocity-sensitive limiter 104, and a steering-angular-acceleration-sensitive limiter 105. The lower limit computing unit 100 further includes two adders 106, 107.

Like the adder 97 of the upper limit computing unit 90, the adder 107 adds the correction torque command value τ* generated by the host ECU 55 to the steering torque τ. The steering-torque-sensitive limiter 101 computes a lower limit $I_{LL1}$* for the assist control amount $I_{as}$* based on the steering torque τ. When the correction torque command value τ* is generated by the host ECU 55, the steering-torque-sensitive limiter 101 computes the lower limit $I_{LL1}$* corresponding to the final steering torque τ obtained by adding the correction torque command value τ* to the steering torque τ detected by the torque sensor 53. The steering-torque-derivative-value-sensitive limiter 102 computes a lower limit $I_{LL2}$* for the assist control amount $I_{as}$* based on the steering torque derivative value dτ. The steering-angle-sensitive limiter 103 computes a lower limit $I_{LL3}$* for the assist control amount $I_{as}$* based on the steering angle θs. The steering-angular-velocity-sensitive limiter 104 computes a lower limit $I_{LL4}$* for the assist control amount $I_{as}$* based on the steering velocity ωs. The steering-angular-acceleration-sensitive limiter 105 computes a lower limit $I_{LL5}$* for the assist control amount $I_{as}$* based on the steering angular acceleration αs.

The adder 106 generates the lower limit $I_{LL}$* for the assist control amount $I_{as}$* by adding the five lower limits $I_{LL1}$* to $I_{LL5}$* together. When the correction torque command value τ* is generated by the host ECU 55, the correction torque command value τ*, which is a command from the host ECU 55, is taken into account in generation of the lower limit $I_{LL1}$* by the steering-torque-sensitive limiter 101. As a result, the final lower limit $I_{LL}$* generated by the adder 106 also reflects the command from the host ECU 55.

The upper limit computing unit 90 and the lower limit computing unit 100 compute the upper limits $I_{UL1}$* to $I_{UL5}$* and the lower limits $I_{LL1}$* to $I_{LL5}$* using first to fifth limit maps M1 to M5. The first to fifth limit maps M1 to M5 are stored in a memory device (not illustrated) of the microcomputer 42. The first to fifth limit maps M1 to M5 are set based on a concept that the assist control amount $I_{as}$* computed based on the driver's steering operation is permitted and an abnormal assist control amount $I_{as}$* due to some other reason is not permitted.

Figure 5:
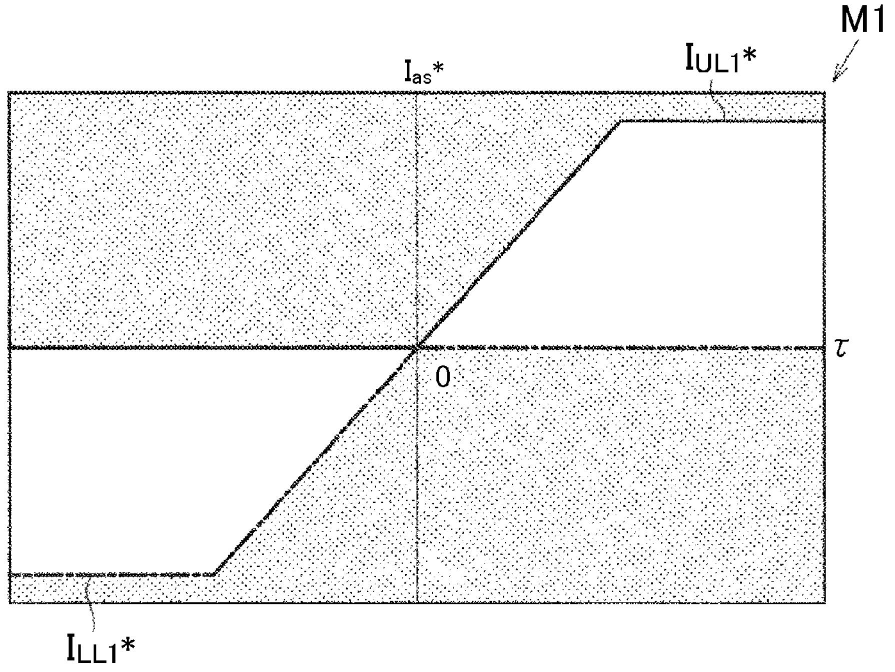
FIG. 5 is a map illustrating the relationship between the steering torque and the limiting values in the first embodiment.

As illustrated in FIG. 5, the first limit map M1 is a map in which the abscissa axis represents the steering torque τ and the ordinate axis represents the assist control amount $I_{as}$*, and defines a relationship between the steering torque τ and the upper limit $I_{UL1}$* for the assist control amount $I_{as}$* and a relationship between the steering torque τ and the lower limit $I_{LL1}$* for the assist control amount $I_{as}$*. The steering-torque-sensitive limiters 91, 101 respectively compute the upper limit $I_{UL1}$* and the lower limit $I_{LL1}$* based on the steering torque τ using the first limit map M1.

The first limit map M1 is set based on a concept that the assist control amount $I_{as}$* having the same sign (positive sign or negative sign) as that of the steering torque τ is permitted and the assist control amount $I_{as}$* having the sign different from that of the steering torque τ is not permitted, and thus has the following characteristics. That is, when the steering torque τ is a positive value, the upper limit $I_{UL1}$* for the assist control amount $I_{as}$* increases in the positive direction with an increase in the steering torque τ, and is maintained at a constant positive value after the steering torque τ reaches a prescribed value. When the steering torque τ is a positive value, the lower limit $I_{LL1}$* for the assist control amount $I_{as}$* is maintained at zero. On the other hand, when the steering torque τ is a negative value, the upper limit $I_{UL1}$* for the assist control amount $I_{as}$* is maintained at zero. When the steering torque τ is a negative value, the lower limit $I_{LL1}$* for the assist control amount $I_{as}$* increases in the negative direction with an increase in the absolute value of the steering torque τ, and is maintained at a constant negative value after the steering torque τ reaches a prescribed value.

Figure 6:
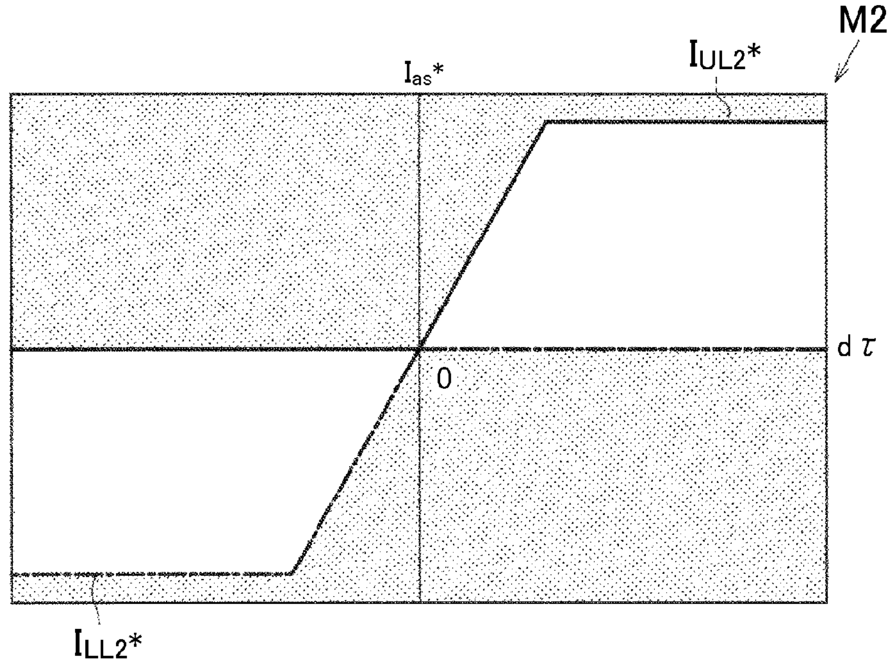
FIG. 6 is a map illustrating the relationship between the steering torque derivative value and the limiting values in the first embodiment.

As illustrated in FIG. 6, the second limit map M2 is a map in which the abscissa axis represents the steering torque derivative value dτ and the ordinate axis represents the assist control amount $I_{as}$*, and defines a relationship between the steering torque derivative value dτ and the upper limit $I_{UL2}$* for the assist control amount $I_{as}$* and a relationship between the steering torque derivative value dτ and the lower limit $I_{LL2}$* for the assist control amount $I_{as}$*. The steering-torque-derivative-value-sensitive limiters 92, 102 respectively compute the upper limit $I_{UL2}$* and the lower limit $I_{LL2}$* based on the steering torque derivative value dτ using the second limit map M2.

The second limit map M2 is set based on a concept that the assist control amount $I_{as}$* having the same sign (positive sign or negative sign) as that of the steering torque derivative value dτ is permitted and the assist control amount $I_{as}$* having the sign different from that of the steering torque derivative value dτ is not permitted, and thus has the following characteristics. That is, when the steering torque derivative value dτ is a positive value, the upper limit $I_{UL2}$* for the assist control amount $I_{as}$* increases in the positive direction with an increase in the steering torque derivative value dτ, and is maintained at a constant positive value after the steering torque derivative value dτ reaches a prescribed value. When the steering torque derivative value dτ is a positive value, the lower limit $I_{LL2}$* for the assist control amount $I_{as}$* is maintained at zero. On the other hand, when the steering torque derivative value dτ is a negative value, the upper limit $I_{UL2}$* for the assist control amount $I_{as}$* is maintained at zero. When the steering torque derivative value dτ is a negative value, the lower limit $I_{LL2}$* for the assist control amount $I_{as}$* increases in the negative direction with an increase in the absolute value of the steering torque derivative value dτ, and is maintained at a constant negative value after the steering torque derivative value dτ reaches a prescribed value.

Figure 7:
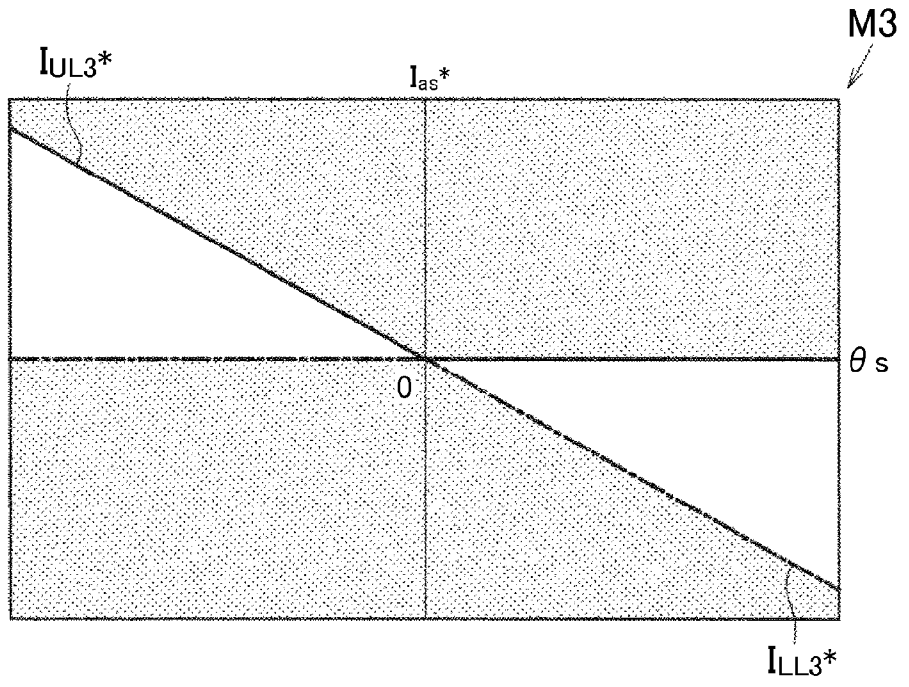
FIG. 7 is a map illustrating the relationship between the steering angle and the limiting values in the first embodiment.

As illustrated in FIG. 7, the third limit map M3 is a map in which the abscissa axis represents the steering angle θs and the ordinate axis represents the assist control amount $I_{as}$*, and defines a relationship between the steering angle θs and the upper limit $I_{UL3}$* for the assist control amount $I_{as}$* and a relationship between the steering angle θs and the lower limit $I_{LL3}$* for the assist control amount $I_{as}$*. The steering-angle-sensitive limiters 93, 103 respectively compute the upper limit $I_{UL3}$* and the lower limit $I_{LL3}$* based on the steering angle θs using the third limit map M3.

The third limit map M3 is set based on a concept that the assist control amount $I_{as}$* that is opposite in sign (positive sign or negative sign) to the steering angle θs is permitted and the assist control amount $I_{as}$* having the same sign as that of the steering angle θs is not permitted, and thus has the following characteristics. That is, when the steering angle θs is a positive value, the upper limit $I_{UL3}$* for the assist control amount $I_{as}$* is maintained at zero. When the steering angle θs is a positive value, the lower limit $I_{LL3}$* for the assist control amount $I_{as}$* increases in the negative direction with an increase in the steering angle θs. On the other hand, when the steering angle θs is a negative value, the upper limit $I_{UL3}$* for the assist control amount $I_{as}$* increases in the positive direction with an increase in the absolute value of the steering angle θs. When the steering angle θs is a negative value, the lower limit $I_{LL3}$* for the assist control amount $I_{as}$* is maintained at zero.

Figure 8:
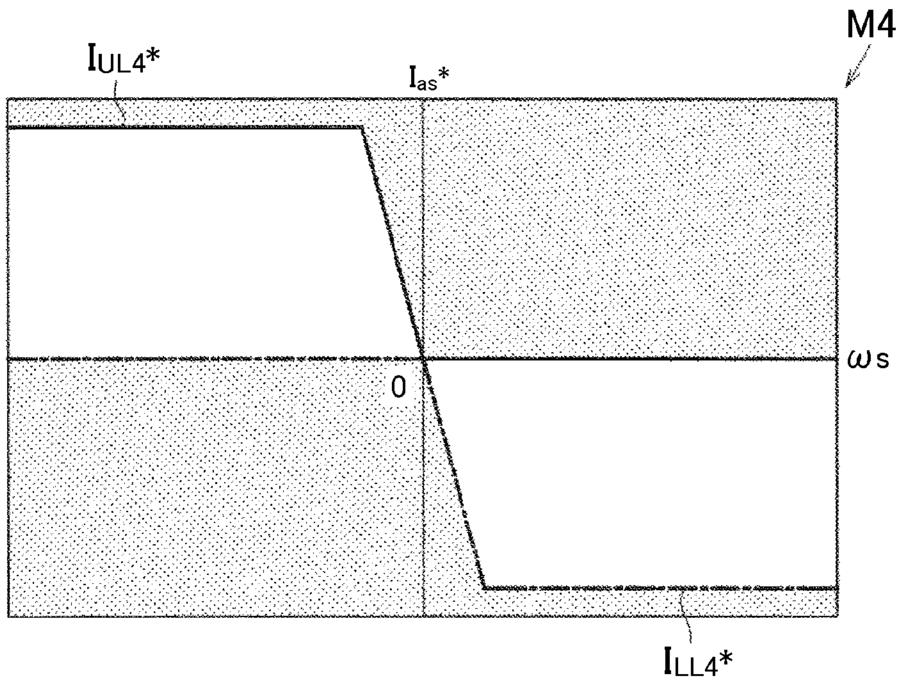
FIG. 8 is a map illustrating the relationship between the steering velocity and the limiting values in the first embodiment.

As illustrated in FIG. 8, the fourth limit map M4 is a map in which the abscissa axis represents the steering velocity ωs and the ordinate axis represents the assist control amount $I_{as}$*, and defines a relationship between the steering velocity ωs and the upper limit $I_{UL4}$* for the assist control amount $I_{as}$* and a relationship between the steering velocity ωs and the lower limit $I_{LL4}$* for the assist control amount $I_{as}$*. The steering-angular-velocity-sensitive limiters 94, 104 respectively compute the upper limit $I_{UL4}$* and the lower limit $I_{LL4}$* based on the steering velocity ωs using the fourth limit map M4.

The fourth limit map M4 is set based on a concept that the assist control amount $I_{as}$* that is opposite in sign (positive sign or negative sign) to the steering velocity ωs is permitted and the assist control amount $I_{as}$* having the same sign as that of the steering velocity ωs is not permitted, and thus has the following characteristics. That is, when the steering velocity ωs is a positive value, the upper limit $I_{UL4}$* for the assist control amount $I_{as}$* is maintained at zero. When the steering velocity ωs is a positive value, the lower limit $I_{LL4}$* for the assist control amount $I_{as}$* increases in the negative direction with an increase in the steering velocity ωs, and is maintained at a constant negative value after the steering velocity ωs reaches a prescribed value. On the other hand, when the steering velocity ωs is a negative value, the upper limit $I_{UL4}$* for the assist control amount $I_{as}$* increases in the positive direction with an increase in the absolute value of the steering velocity ωs, and is maintained at a constant positive value after the steering velocity ωs reaches a prescribed value. When the steering velocity ωs is a negative value, the lower limit $I_{LL4}$* for the assist control amount $I_{as}$* is maintained at zero.

Figure 9:
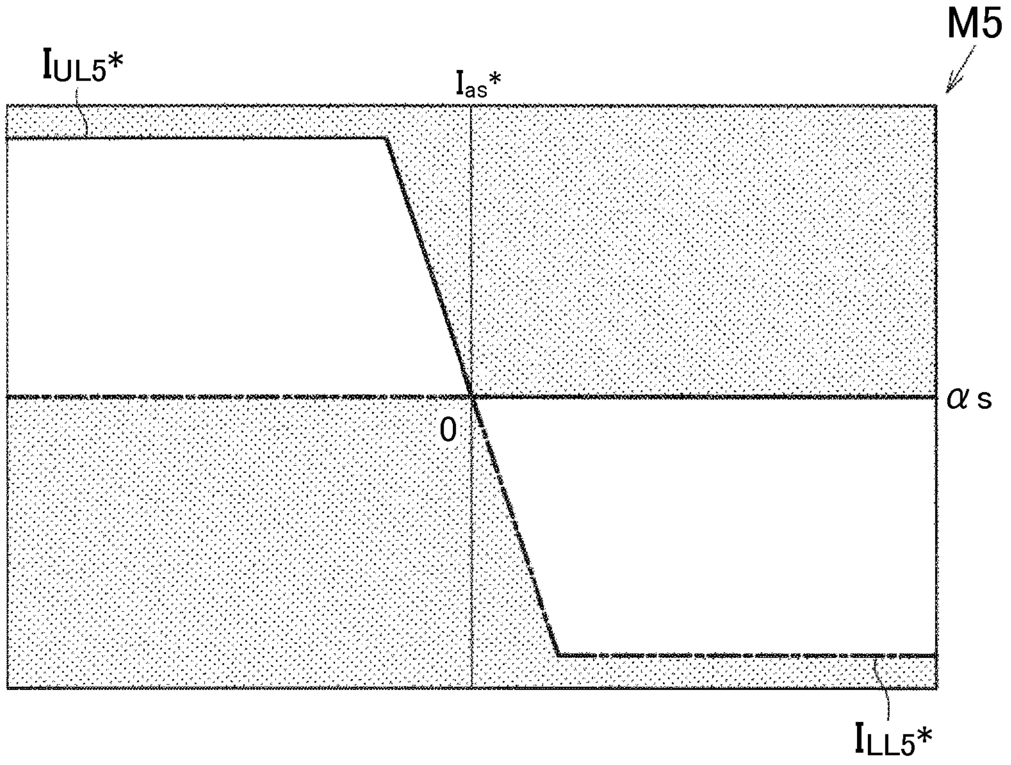
FIG. 9 is a map illustrating the relationship between the steering angular acceleration and the limiting values in the first embodiment.

As illustrated in FIG. 9, the fifth limit map M5 is a map in which the abscissa axis represents the steering angular acceleration αs and the ordinate axis represents the assist control amount $I_{as}$*, and defines a relationship between the steering angular acceleration αs and the upper limit $I_{UL5}$* for the assist control amount $I_{as}$* and a relationship between the steering angular acceleration αs and the lower limit $I_{LL5}$* for the assist control amount $I_{as}$*. The steering-angular-acceleration-sensitive limiters 95, 105 respectively compute the upper limit $I_{UL5}$* and the lower limit $I_{LL5}$* based on the steering angular acceleration αs using the fifth limit map M5.

The fifth limit map M5 is set based on a concept that the assist control amount $I_{as}$* that is opposite in sign (positive sign or negative sign) to the steering angular acceleration αs is permitted and the assist control amount $I_{as}$* having the same sign as that of the steering angular acceleration αs is not permitted, and thus has the following characteristics. That is, when the steering angular acceleration αs is a positive value, the upper limit $I_{UL5}$* for the assist control amount $I_{as}$* is maintained at zero. When the steering angular acceleration αs is a positive value, the lower limit $I_{LL5}$* for the assist control amount $I_{as}$* increases in the negative direction with an increase in the steering angular acceleration αs, and is maintained at a constant negative value after the steering angular acceleration αs reaches a prescribed value. On the other hand, when the steering angular acceleration αs is a negative value, the upper limit $I_{UL5}$* for the assist control amount $I_{as}$* increases in the positive direction with an increase in the absolute value of the steering angular acceleration αs, and is maintained at a constant positive value after the steering angular acceleration αs reaches a prescribed value. When the steering angular acceleration αs is a negative value, the lower limit $I_{LL5}$* for the assist control amount $I_{as}$* is maintained at zero.

Next, the basic operation of the electric power steering system 10 will be described below. The limiting values (the upper limit and the lower limit) for the assist control amount $I_{as}$* are set individually for the signals used to compute the assist control amount $I_{as}$*, that is, the steering torque τ, the steering torque derivative value dτ, the steering angle θs, the steering velocity ωs, and the steering angular acceleration αs, which are the state quantities indicating the steering state. When computing the final current command value I* based on the assist control amount $I_{as}$*, the microcomputer 42 sets, for the respective signals, the limiting values for limiting the variation range of the assist control amount $I_{as}$* based on the values of the signals, and sets values, obtained by adding the limiting values, as final limiting values for the assist control amount $I_{as}$*. In addition, the limiting values for the respective signals and the final limiting values are set based on a concept that the normal assist control amount $I_{as}$* computed in response to the driver's steering operation is permitted and the abnormal assist control amount $I_{as}$* generated for some reason is not permitted. The microcomputer 42 permits the compensation amounts based on various compensation controls such as torque derivative control and steering return control due to the driver's steering input, whereas the microcomputer 42 limits an abnormal output that is greater than the value of each compensation amount or an erroneous output.

When the assist control amount $I_{as}$* falls outside a limit range defined by the final upper limit $I_{UL}$* and the final lower limit $I_{LL}$*, the microcomputer 42 limits the assist control amount $I_{as}$* such that the assist control amount $I_{as}$* greater than the upper limit $I_{UL}$* or the assist control amount $I_{as}$* less than the lower limit $I_{LL}$* is not supplied, as the final current command value I*, to the motor control signal generating unit 62. The limiting values (the upper limit and the lower limit) individually set for respective signals are reflected in the final upper limit $I_{UL}$* and the final lower limit $I_{LL}$*. That is, even when the assist control amount $I_{as}$* exhibiting an abnormal value is computed, the value of the abnormal assist control amount $I_{as}$* is limited to an appropriate value corresponding to each signal value by the final limiting values. By supplying the appropriate assist control amount $I_{as}$*, as the final current command value I*, to the motor control signal generating unit 62, an appropriate assist force is applied to the steering system. Because the abnormal assist control amount $I_{as}$* is prevented from being supplied, as the final current command value I*, to the motor control signal generating unit 62, an unexpected assist force is prevented from being applied to the steering system. For example, occurrence of so-called self-steering is reduced.

The appropriate limiting values for the assist control amount $I_{as}$* are individually set based on the respective signals used to compute the assist control amount $I_{as}$*. Therefore, more precise limiting process is executed on the assist control amount $I_{as}$*, for example, as compared with the case where the limiting values for the assist control amount $I_{as}$* are set based on only the steering torque τ that is a signal used to compute the basic assist control amount $I_1$*. In the setting of the limiting values for the assist control amount $I_{as}$*, it is no longer necessary to take into account the influence on the compensation amounts $I_2$*, $I_3$*, $I_4$*.

In the present embodiment, the assist control amount $I_{as}$* may continue to be limited as long as the abnormality of the assist control amount $I_{as}$* is present. Alternatively, the following configuration may be employed from the viewpoint of enhancing the safety.

Figure 10:
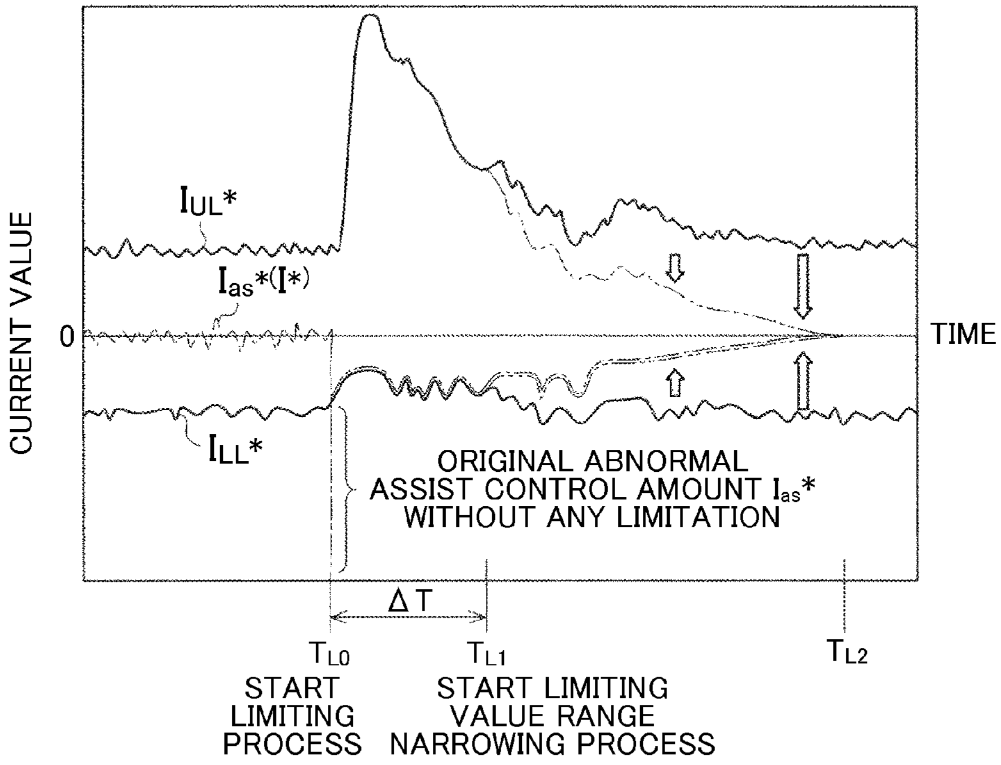
FIG. 10 is a graph illustrating variations in the assist control amount (current command value) in the first embodiment.

As illustrated in a graph in FIG. 10, for example, when the value of the assist control amount $I_{as}$* is less than the lower limit $I_{LL}$* (time $T_{L0}$), the value of the assist control amount $I_{as}$* is limited to the lower limit $I_{LL}$*. When the state where the value of the assist control amount $I_{as}$* is limited to the lower limit $I_{LL}$* has continued for a prescribed period ΔT (time $T_{L1}$), the microcomputer 42 gradually decreases the absolute value of the lower limit $I_{LL}$* to zero (hereinafter, referred to as "gradual decrease process"). At the timing (time $T_{L2}$) at which the absolute value of the lower limit $I_{LL}$* reaches zero, the value of the assist control amount $I_{as}$* becomes zero. As a result, the application of the assist force to the steering system is stopped. The gradual decrease process is executed based on a concept that the application of the assist force is preferably stopped when the abnormal state has continued for the prescribed period ΔT. The value of the assist control amount $I_{as}$* gradually decreases and thus the steering feel is not abruptly changed when the assist is stopped. The same is true when the value of the assist control amount $I_{as}$* is greater than the upper limit $I_{UL}$*. That is, the microcomputer 42 gradually decreases the upper limit $I_{UL}$* to zero when the state where the assist control amount $I_{as}$* is limited to the upper limit $I_{UL}$* has continued for the prescribed period ΔT.

The gradual decrease process is forcibly executed regardless of the process of computing the upper limit $I_{UL}$* and the lower limit $I_{LL}$*. The microcomputer 42 may stop execution of the gradual decrease process when the value of the assist control amount $I_{as}$* is returned to a value within the normal range between the upper limit $I_{UL}$* and the lower limit $I_{LL}$*, inclusive, during the execution of the gradual decrease process. Thus, the upper limit $I_{UL}$* or the lower limit $I_{LL}$*, of which the absolute value is forcibly decreased gradually to zero, is returned to the original value.

Next, the operation of the electric power steering system 10 when the cooperative control is executed by the host ECU 55 will be described.

For example, when it is necessary to perform an emergency avoidance operation (operation for avoiding occurrence of an emergency) on the vehicle, the host ECU 55 generates a command for the in-vehicle system that is required to promote the emergency avoidance operation on the vehicle. In order to promote steering for avoiding occurrence of an emergency, the host ECU 55 generates, for example, a correction torque command value τ* as a command for the ECU 40. The correction torque command value τ* is set from the viewpoint of increasing the assist force, in other words, reducing the steering torque τ. The ECU 40 computes the final assist control amount $I_{as}$* by adding the current amount τ,* corresponding to the correction torque command value τ*, to the assist control amount $I_{\tau}$* generated by the assist controller 71. The final assist control amount $I_{as}$* reflects the correction torque command value τ*, which is a command from the host ECU 55. Thus, the motor 31 generates an assist torque (assist force) that reflects the correction torque based on the correction torque command value τ*. The application of the assist torque to the steering mechanism 20 promotes emergency avoidance steering.

It is necessary that how to set the limiting values (the upper limit $I_{UL}$* and the lower limit $I_{LL}$*) be considered. That is, it is necessary that whether to reflect a command from the host ECU 55 in the limiting values be considered. The bottom line is that, because the final assist control amount $I_{as}$* is generated so as to reflect the correction torque command value τ*, which is a command from the host ECU 55, it is preferable that the limiting values for the assist control amount $I_{as}$* be generated so as to reflect the correction torque command value τ*.

If the upper-lower limit computing unit 72 computes the limiting values without taking into account a command from the host ECU 55, there is the following concern. As illustrated in a graph in FIG. 11, the limiting value (absolute value) when the steering torque τ is a first steering torque τ1 is a first limiting value Y1. The limiting value (absolute value) when the steering torque τ is a second steering torque τ2 is a second limiting value Y2. The second steering torque τ2 is a value smaller than the first steering torque τ1. The correction torque command value τ* generated by the host ECU 55 is used to change the steering torque τ from the first steering torque τ1, which is the present steering torque τ, to the second steering torque τ2.

Under the above precondition, when the correction torque command value τ* is generated by the host ECU 55 while the steering torque τ is maintained at the first steering torque τ1, the assist control itself executed by the ECU 40 is momentarily unchanged. The host ECU 55 generates the correction torque command value τ* independently of the state of the electric power steering system 10. Further, the correction torque command value τ* is externally and forcibly added to the assist control amount $I_{as}$* generated by the assist controller 71. However, the upper-lower limit computing unit 72 momentarily computes the limiting values based on the steering torque τ used so far. Thus, the assist control amount $I_{as}$* obtained by forcibly adding the correction torque command value τ* to the assist control amount $I_{as}$* generated by the assist controller 71 may exceed the limiting value.

Further, due to, for example, the inertia of the system, the assist control amount $I_{as}$* and the limiting value may fail to completely correspond to each other. Thus, the assist control amount $I_{as}$* itself, which is generated by the assist controller 71, may momentarily be the limiting value Y3 corresponding to the first steering torque τ1, and the limiting value generated by the upper-lower limit computing unit 72 may momentarily be the second limiting value Y2 corresponding to the second steering torque $\tau$2. In this case, the ECU 40 may make a false determination that an abnormal assist control amount $I_{as}$* is generated despite the fact that the normal assist control amount $I_{as}$* is generated.

Figure 11:
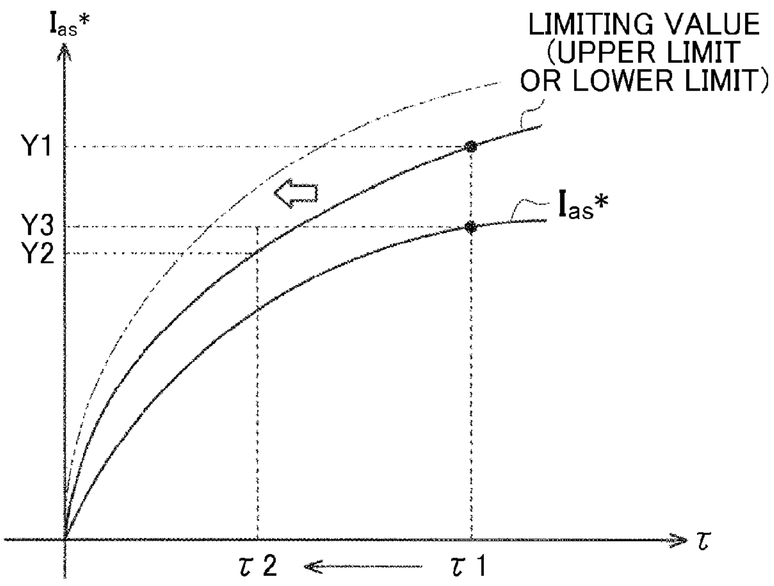
FIG. 11 is a graph illustrating the relationship between the required torque and the limiting value on the assist control amount in the first embodiment.

In order to avoid such a situation, as indicated by a long dashed double-short dashed line in a graph in FIG. 11, the limiting value is set such that an increase in the assist control amount $I_{as}$* due to addition of the correction torque command value $\tau$* is permitted.

In view of this, in the present embodiment, the upper-lower limit computing unit 72 acquires the correction torque command value $\tau$*, and adds the acquired correction torque command value $\tau$* to the steering torque $\tau$. The steering-torque-sensitive limiters 91, 101 compute the upper limit $I_{UL1}$* and the lower limit $I_{LL1}$*, respectively, based on the steering torque $\tau$ obtained by adding the correction torque command value $\tau$* to the steering torque $\tau$ detected by the torque sensor 53.

Figure 12:
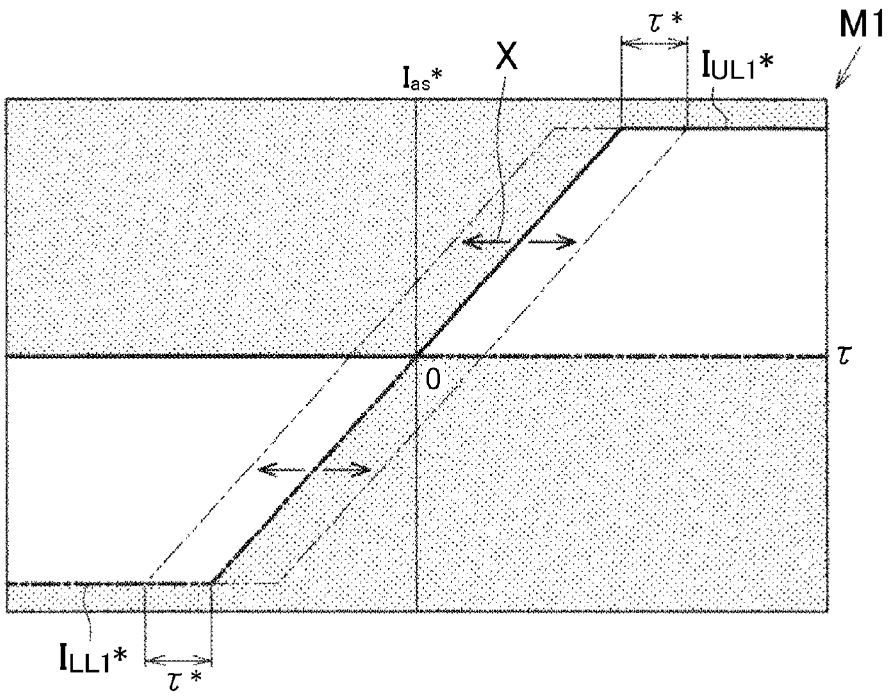
FIG. 12 is a map illustrating the relationship between the steering torque and the limiting values in vehicle cooperative control in the first embodiment.

As indicated by long dashed double-short dashed lines in FIG. 12, the steering-torque-sensitive limiters 91, 101 offset the original limiting values $I_{UL1}$*, $I_{LL1}$* with respect to the steering torque $\tau$, by an amount corresponding to the correction torque command value $\tau$*1, along the abscissa axis of the first limit map M1. Then, the limiting values are set based on the first limit map M1 containing the limiting values offset from the original limiting values. In the above-described example where the correction torque command value $\tau$* generated by the host ECU 55 is a command for changing the steering torque $\tau$ from the first steering torque $\tau$1 to the second steering torque $\tau$2 ($<\tau$1), the original limiting values with respect to the steering torque $\tau$ are offset by an amount corresponding to the correction torque command value $\tau$* in such a direction that the steering torque $\tau$ is decreased, as indicated by arrows X pointing to the left. The correction torque command value $\tau$* is taken into account in setting the individual limiting values $I_{UL1}$*, $I_{LL1}$* and consequently setting the final limiting values $I_{UL}$*, $I_{LL}$*. This makes it possible to more appropriately limit the assist control amount $I_{as}$* that reflects the correction torque command value $\tau$*.

According to the first embodiment, the following advantageous effects 1) to 3) are obtained.

1) The limiting values for the assist control amount $I_{as}$* are individually set for the respective signals (the respective state quantities) used to compute the assist control amount $I_{as}$*, and the values, obtained by adding the limiting values, are set as the final limiting values for the assist control amount $I_{as}$*. Thus, even when the assist control amount $I_{as}$* exhibiting an abnormal value is computed for some reason, the abnormal assist control amount $I_{as}$* is limited by the final limiting values to an appropriate value directly based on the signal values. By supplying the motor control signal generating unit 62 with the assist control amount $I_{as}$* limited to an appropriate value as the final current command value I*, it is possible to reliably prevent application of an unexpected assist force to the steering system.

2) The current amount $I_\tau$* corresponding to the correction torque command value $\tau$* generated by the host ECU 55 is added to the assist control amount $I_{as}$*, and, in addition, the upper-lower limit computing unit 72 acquires the correction torque command value $\tau$*. The upper-lower limit computing unit 72 computes the limiting values for the assist control amount $I_{as}$*, using the value obtained by adding correction torque command value $\tau$* to the steering torque $\tau$. Thus, it is possible to execute the more appropriate limiting process based on the cooperative control executed by the host ECU 55, while maintaining the simple configuration.

Next, an electric power steering system according to a second embodiment of the invention will be described. The electric power steering system according to the present embodiment basically has the same configurations as those in the first embodiment illustrated in FIG. 1 to FIG. 12.

Commands from the host ECU 55 may include requests regarding various compensation amounts. For example, detailed instructions, such as an instruction to slightly increase viscous damping or an instruction to slightly decrease viscous damping, may be issued based on the vehicle state. The host ECU 55 generates, for example, a gain, as a request regarding the current compensation amount.

Figure 13:
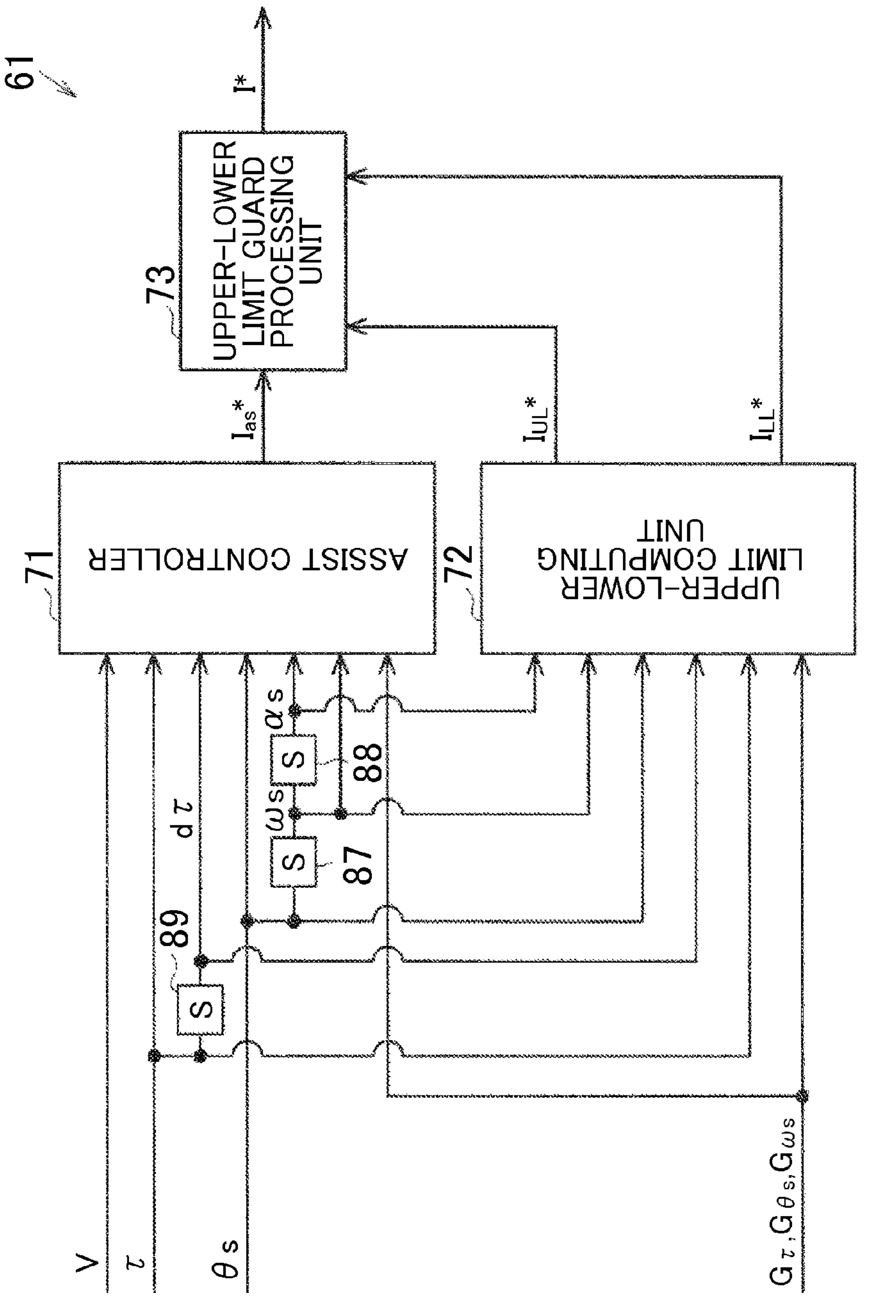
FIG. 13 is a control block diagram of a current command value computing unit in a second embodiment of the invention.

As illustrated in FIG. 13, the host ECU 55 generates, for example, a torque gain $G_\tau$, a return control gain $G_{\theta S}$, and a damping gain $G_{\omega S}$. The assist controller 71 acquires the torque gain $G_\tau$, the return control gain $G_{\theta S}$, and the damping gain $G_{\omega S}$. The upper-lower limit computing unit 72 acquires the torque gain $G_\tau$, the return control gain $G_{\theta S}$, and the damping gain $G_{\omega S}$.

Figure 14:
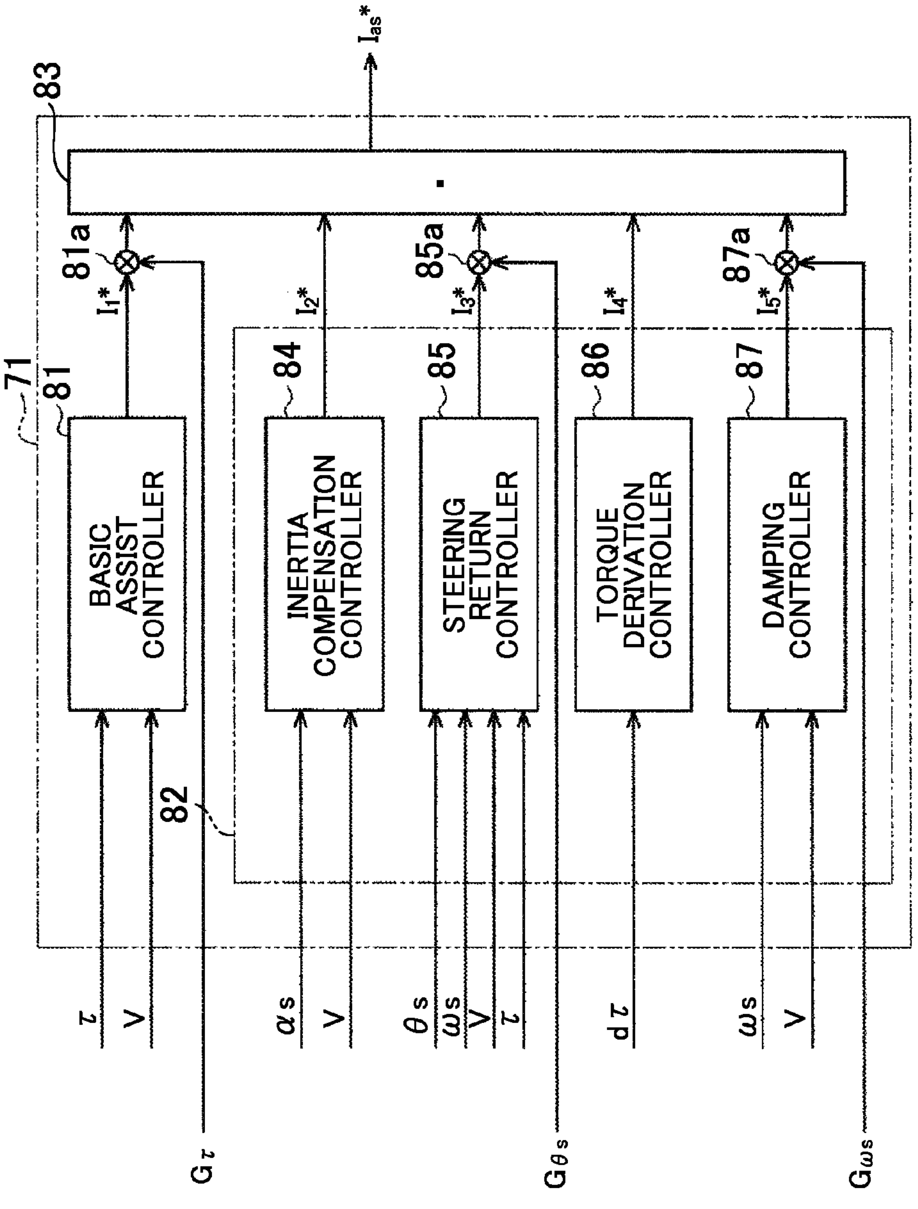
FIG. 14 is a control block diagram of an assist controller in the second embodiment.

As illustrated in FIG. 14, the assist controller 71 includes three multipliers 81*a*, 85*a*, 87*a*. The multiplier 81*a* generates a final basic assist control amount $I_1$* by multiplying the basic assist control amount $I_1$* computed by the basic assist controller 81 by the torque gain $G_\tau$ from the host ECU 55. The multiplier 85*a* generates a final compensation amount $I_3$* by multiplying the compensation amount $I_3$* computed by the steering return controller 85 by the return control gain $G_{\theta S}$ from the host ECU 55. The multiplier 87*a* generates a final compensation amount $I_5$* by multiplying the compensation amount $I_5$* computed by the damping gain $G_{\omega S}$ from the host ECU 55.

Figure 15:
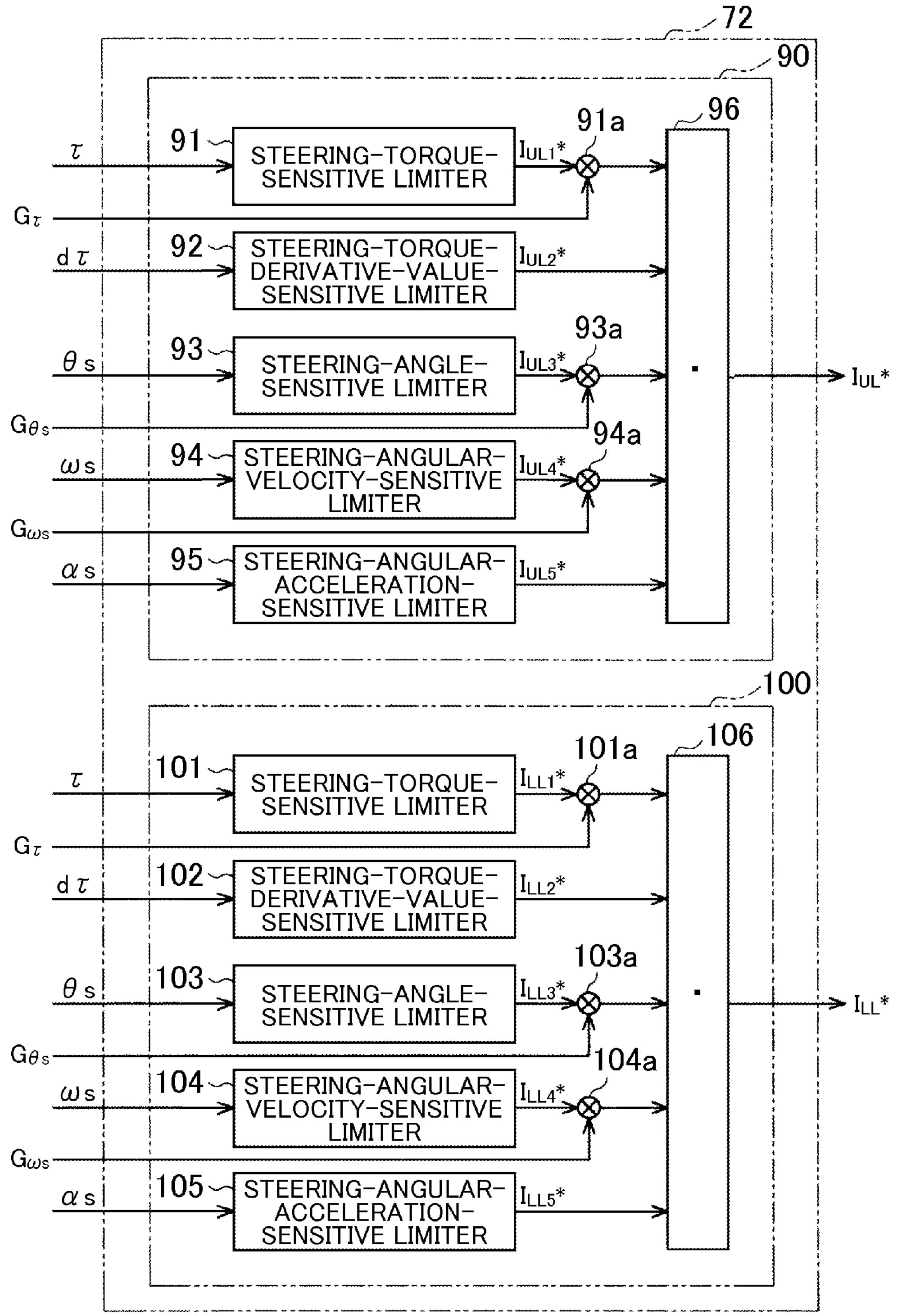
FIG. 15 is a control block diagram of an upper-lower limit computing unit in the second embodiment.

As illustrated in FIG. 15, each of the upper limit computing unit 90 and the lower limit computing unit 100 acquires the torque gain $G_\tau$, the return control gain $G_{\theta S}$, and the damping gain $G_{\omega S}$. The upper limit computing unit 90 includes three multipliers 91*a*, 93*a*, 94*a*. The multiplier 91*a* generates a final upper limit $I_{UL1}$* by multiplying the upper limit $I_{UL1}$* computed by the steering-torque-sensitive limiter 91 by the torque gain $G_\tau$ from the host ECU 55. The multiplier 93*a* generates a final upper limit $I_{UL3}$* by multiplying the upper limit $I_{UL3}$* computed by the steering-angle-sensitive limiter 93 by the return control gain $G_{\theta S}$ from the host ECU 55. The multiplier 94*a* generates a final upper limit $I_{UL4}$* by multiplying the upper limit $I_{UL4}$* computed by the steering-angular-velocity-sensitive limiter 94 by the damping gain $G_{\omega S}$ from the host ECU 55.

Similarly, the lower limit computing unit 100 includes three multipliers 101*a*, 103*a*, 104*a*. The multiplier 101*a* generates a final lower limit $I_{LL1}$* by multiplying the lower limit $I_{LL1}$* computed by the steering-torque-sensitive limiter 101 by the torque gain $G_\tau$ from the host ECU 55. The multiplier 103*a* generates a final lower limit $I_{LL3}$* by multiplying the lower limit $I_{LL3}$* computed by the steering-angle-sensitive limiter 103 by the return control gain $G_{\theta S}$ from the host ECU 55. The multiplier 104*a* generates a final lower limit $I_{LL4}$* by multiplying the lower limit $I_{LL4}$* computed by the steering-angular-velocity-sensitive limiter 104 by the damping gain $G_{\omega S}$ from the host ECU 55.

The signal that serves as a base for the computation of the basic assist control amount $I_1$* is the steering torque $\tau$. Therefore, it is preferable that the upper limit $I_{UL1}$* and the lower limit $I_{LL1}$*, which are the results of computation executed by the steering-torque-sensitive limiters 91, 101, be multiplied by the torque gain $G_\tau$. The signal that serves as a base for the steering return control is the steering angle θs. Therefore, it is preferable that the upper limit $I_{UL3}$ and the lower limit $I_{LL3}$, which are the results of computation executed by the steering-angle-sensitive limiters 93, 103, be multiplied by the return control gain $G_{\theta S}$. The signal that serves as a base for the damping control is the steering velocity ωs. Therefore, it is preferable that the upper limit $I_{UL4}$* and the lower limit $I_{LL4}$*, which are the results of computation executed by the steering-angular-velocity-sensitive limiters 94, 104, be multiplied by the damping gain $G_{\omega S}$.

As described above, the individual limiting values $I_{UL1}$*, $I_{UL3}$*, $I_{UL4}$*, $I_{LL1}$*, $I_{LL3}$*, $I_{LL4}$* set based on the state quantities τ, θs, ωs, which are the bases for the computation of the compensation amounts $I_1$*, $I_3$*, $I_5$* to be multiplied by the gains $G_\tau$, $G_{\theta S}$, $G_{\omega S}$, are multiplied by the gains $G_\tau$, $G_{\theta S}$, $G_{\omega S}$. This produces the following advantageous effects. The upper limit $I_{UL}$* and the lower limit $I_{LL}$* that are generated by the upper-lower limit computing unit 72 are the values each of which reflects the torque gain $G_\tau$, the return control gain $G_{\theta S}$, and the damping gain $G_{\theta S}$. As a result, it is possible to execute more appropriate control process on the assist control amount $I_{as}$* that reflects the torque gain $G_\tau$, the return control gain $G_{\theta S}$, and the damping gain $G_{\omega S}$.

If the upper-lower limit computing unit 72 does not acquire the gains $G_\tau$, $G_{\theta S}$, $G_{\omega S}$, there is the following concern. The case where execution of the damping control is stopped in response to a command from the host ECU 55 will be descried as an example. In this case, the damping gain $G_{\omega S}$ of which the value is zero (hereinafter, referred to as "damping gain $G_{\omega S}$ of zero") is generated by the host ECU 55. The value of the compensation amount $I_5$* is set to zero by multiplying the compensation amount $I_5$* generated by the damping controller 87, by the damping gain $G_{\omega S}$ of zero ($G_{\omega S}$=0). Thus, the assist control amount $I_{as}$* is computed without taking into account the compensation amount $I_5$*.

However, the upper-lower limit computing unit 72 is not able to recognize that the damping gain $G_{\theta S}$ of zero is generated by the host ECU 55. Thus, as at normal times, the upper-lower limit computing unit 72 generates the final limiting values $I_{UL}$*, $I_{LL}$* for the assist control amount $I_{as}$* by taking into account the limiting values $I_{UL4}$*, $I_{LL4}$* generated by the steering-angular-velocity-sensitive limiters 94, 104.

Thus, the deviation between each of the final limiting values $I_{UL}$*, $I_{LL}$* and the final assist control amount $I_{as}$* is increased by an amount corresponding to each of the limiting values $I_{UL4}$*, $I_{LL4}$* that are generated by the steering-angular-velocity-sensitive limiters 94, 104 and that are taken into account into setting of the final limiting values $I_{UL}$*, $I_{LL}$*. That is, the width of the range, which is defined by the final upper limit $I_{UL}$* and the final lower limit $I_{LL}$* and which is used to limit the assist control amount $I_{as}$*, may become unnecessarily large. As the deviation between each of the final limiting values $I_{UL}$*, $I_{LL}$* and the final assist control amount $I_{as}$* is increased, the current deviation (the deviation between the normal assist control amount $I_{as}$* used so far and the limiting value) when an abnormal assist control amount $I_{as}$* is generated becomes larger. As the current deviation becomes larger, the torque fluctuations of the motor 31 become larger.

In this regard, according to the present embodiment, when the damping gain $G_{\omega S}$ of zero is generated by the host ECU 55, the damping gain $G_{\omega S}$ of zero ($G_{\omega S}$=0) is taken into the upper-lower limit computing unit 72, and the limiting values $I_{UL4}$*, $I_{LL4}$* computed by the steering-angular-velocity-sensitive limiters 94, 104 are multiplied by the damping gain $G_{\omega S}$ of zero. As a result, the values of the limiting values $I_{UL4}$*, $I_{LL4}$* become zero. Thus, the final limiting values $I_{UL}$*, $I_{LL}$* for the assist control amount $I_{as}$* are obtained without taking into account the limiting values $I_{UL4}$*, $I_{LL4}$*. In other words, the appropriate limiting values $I_{UL}$*, $I_{LL}$* are computed in accordance with a change in the assist control amount $I_{as}$* based on a command from the host ECU 55. As a result, an increase in the deviation between the assist control amount $I_{as}$* and each of the limiting values $I_{UL}$*, $I_{LL}$* is prevented. Consequently, an increase in the current deviation when an abnormal assist control amount $I_{as}$* is generated is prevented, leading to prevention of an increase in the torque fluctuations of the motor 31.

Therefore, the second embodiment of the invention produces the following advantageous effects. 3) The gains $G_\tau$, $G_{\theta S}$, $G_{\omega S}$ for the controllers 81, 85, 87 of the assist controller 71, which are generated by the host ECU 55, are taken into not only the assist controller 71 but also the upper-lower limit computing unit 72. The computation results obtained by the sensitive limiters 91, 93, 94, 101, 103, 104, which acquire the corresponding signals τ, θs, ωs that serve as the bases for the controls executed by the controllers, are multiplied by the gains $G_\tau$, $G_{\theta S}$, $G_{\omega S}$ that are taken into the upper-lower limit computing unit 72. Thus, the final limiting values $I_{UL}$*, $I_{LL}$* reflect the gain command values. Thus, it is possible to execute the more appropriate limiting process on the assist control amount $I_{as}$* that reflects the gains $G_\tau$, $G_{\theta S}$, $G_{\theta S}$.

Next, an electric power steering system according to a third embodiment of the invention will be described. The electric power steering system according to the present embodiment basically has the same configurations as those in the first embodiment illustrated in FIG. 1 to FIG. 12.

Figure 16:
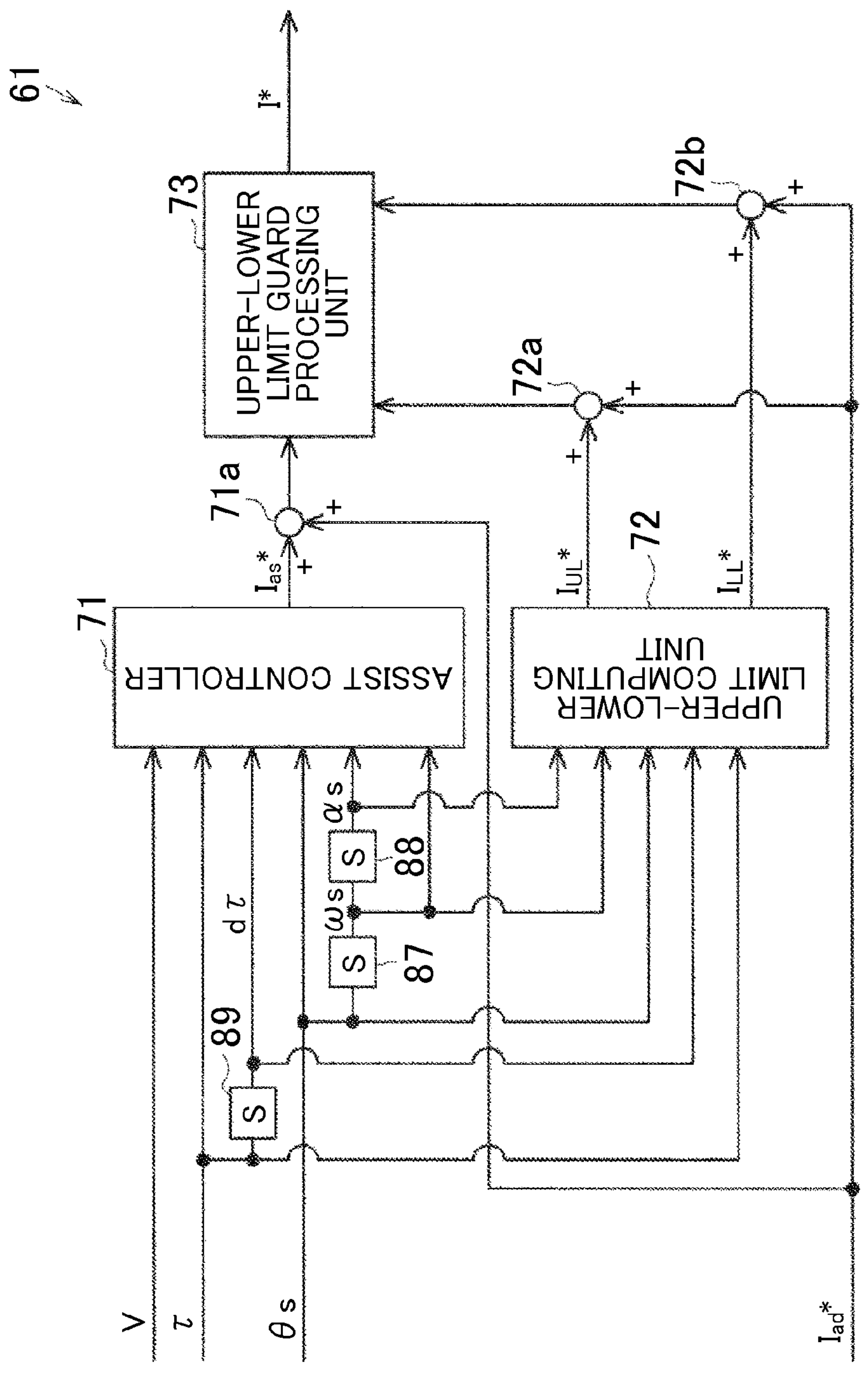
FIG. 16 is a control block diagram of a current command value computing unit in a third embodiment of the invention.

As illustrated in FIG. 16, for example, in order to assist an emergency steering, the host ECU 55 may generate an additional current command value $I_{ad}$* as a request regarding the motor current. The additional current command value $I_{ad}$* is taken into the current command value computing unit 61.

The current command value computing unit 61 includes three adders 71*a*, 72*a*, 72*b*. The adder 71*a* adds the additional current command value $I_{ad}$* to the assist control amount $I_{as}$* generated by the assist controller 71. The adder 72*a* adds the additional current command value $I_{ad}$* to the upper limit $I_{UL}$* generated by the upper-lower limit computing unit 72. The adder 72*b* adds the additional current command value $I_{ad}$* to the lower limit $I_{LL1}$* generated by the upper-lower limit computing unit 72.

Figure 17:
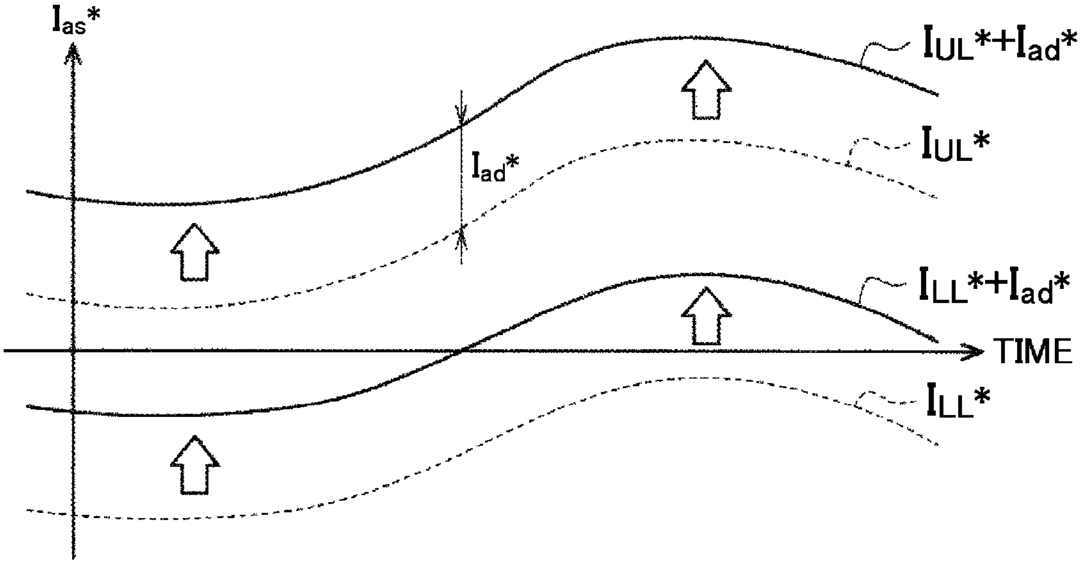
FIG. 17 is a graph illustrating the limiting values in vehicle cooperative control in the third embodiment.

As illustrated in a graph in FIG. 17, the upper-lower limit guard processing unit 73 uses the limiting values $I_{UL}$*+$I_{ad}$*, $I_{LL}$*+$I_{ad}$* that respectively are larger the original limiting values $I_{UL}$*, $I_{LL}$* computed by the upper-lower limit computing unit 72, by an amount corresponding to the additional current command value $I_{ad}$*.

Therefore, the third embodiment of the invention produces the following advantageous effects.

4) The limiting values $I_{UL}$*, $I_{LL}$* are each increased by an amount corresponding to the additional current command value $I_{ad}$* that is added to the assist control amount $I_{as}$*. Therefore, the width of the range, which is defined by the final upper limit $I_{UL}$* and the final lower limit $I_{LL}$* and which is used to limit the assist control amount $I_{as}$*, remain unchanged before and after the addition of the additional current command value $I_{ad}$*. Thus, it is possible to execute the more appropriate control process based on the additional current command value $I_{ad}$* that is a command from the host ECU 55.

Next, an electric power steering system according to a fourth embodiment of the invention will be described. The electric power steering system according to the present embodiment basically has the same configurations as those in the first embodiment illustrated in FIG. 1 to FIG. 12.

Figure 18:
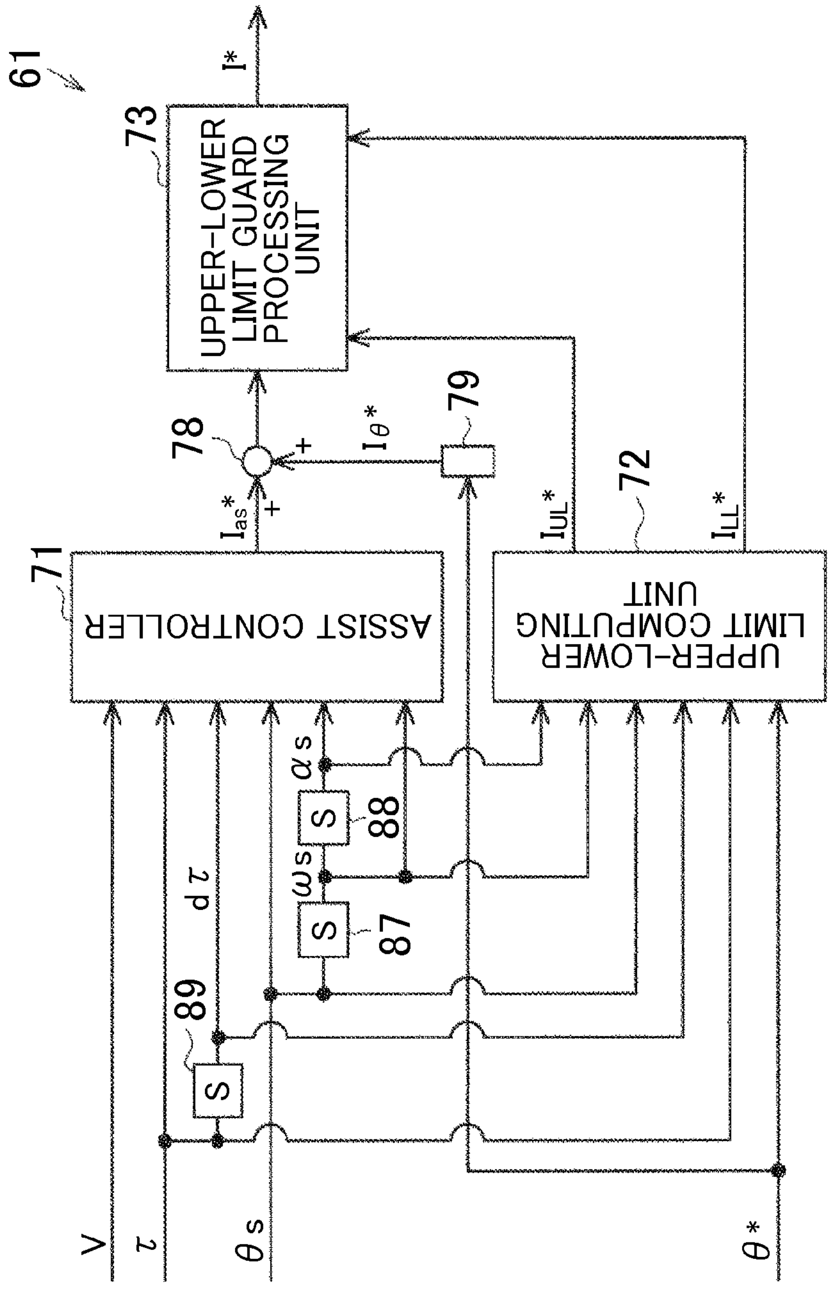
FIG. 18 is a control block diagram of a current command value computing unit in a fourth embodiment of the invention.

As illustrated in FIG. 18, for example, when cooperative control with a parking assist system is executed, the host ECU 55 may generate a steering angle command value θ*. The steering angle command value θ* is taken into the current command value computing unit 61.

The current command value computing unit 61 includes, in addition to the adder 78, a converter 79. The converter 79 converts the steering angle command value θ* into a current amount $I_\theta$*. The adder 78 generates the final assist control amount $I_{as}$* by adding the current amount $I_\theta$* to the assist control amount $I_{as}$* generated by the assist controller 71.

Figure 19:
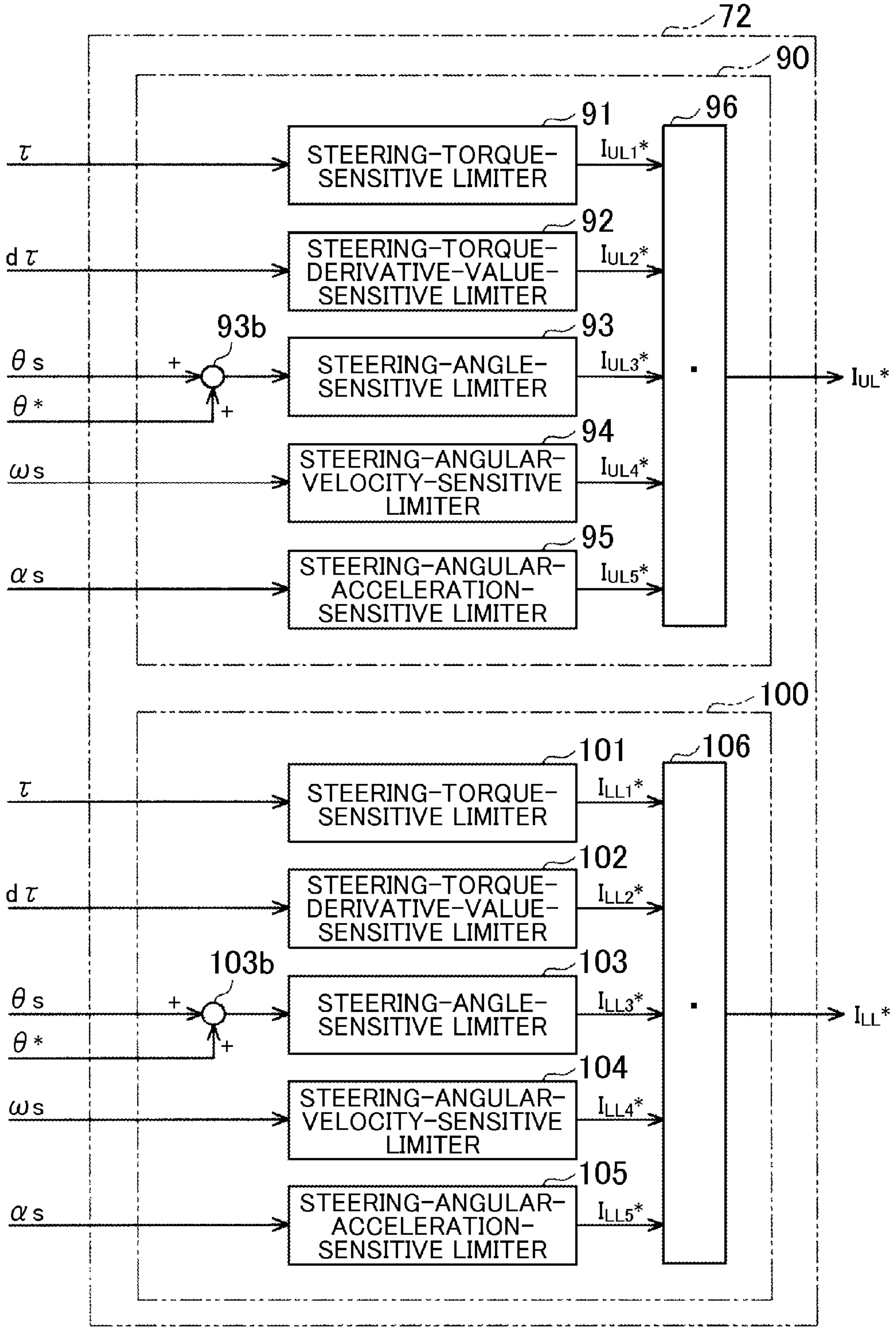
FIG. 19 is a control block diagram of an upper-lower limit computing unit in the fourth embodiment.

As illustrated in FIG. 19, the steering angle command value θ* is taken into each of the upper limit computing unit 90 and the lower limit computing unit 100. The upper limit computing unit 90 includes an adder **93*b*, and the lower limit computing unit 100 includes an adder 103*b*. The adder 93*b*** adds the steering angle command value θ* to the steering angle θs taken into the upper limit computing unit 90. The adder **103*b*** adds the steering angle command value θ* to the steering angle θs taken into the lower limit computing unit 100.

Figure 20:
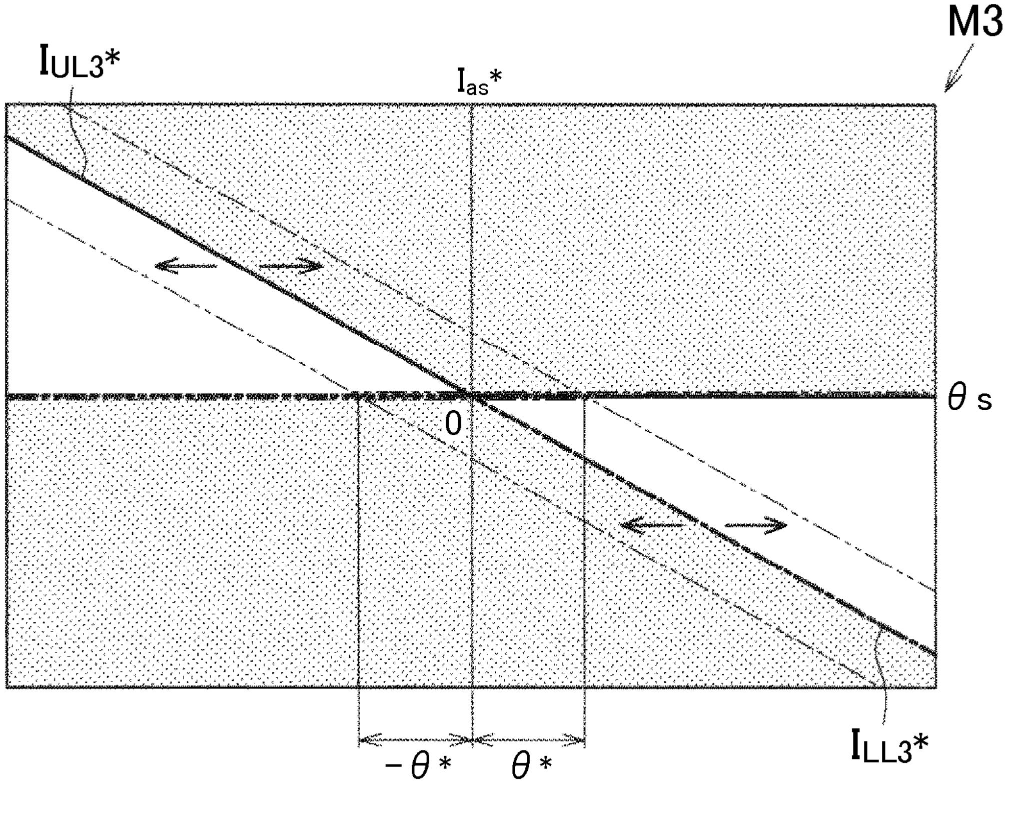
FIG. 20 is a map illustrating the relationship between the steering angle and the limiting values in vehicle cooperative control in the fourth embodiment.

The steering-angle-sensitive limiters 93, 103 respectively compute the upper limit $I_{UL3}$* and the lower limit $I_{LL3}$* based on value obtained by adding the steering angle command value θ* to the steering angle θs. As indicated by long dashed double-short dashed lines in FIG. 20, the steering-angle-sensitive limiters 93, 103 offset the original limiting values $I_{UL3}$*, $I_{LL3}$* with respect to the steering angle θs by an amount corresponding to the steering angle command value θ*, along the abscissa axis of the third limit map M3. Then, the limiting values are set based on the third limit map M3 containing the limiting values offset from the original limiting values.

Therefore, the final limiting values $I_{UL}$*, $I_{LL}$* become more appropriate values for the assist control amount $I_{as}$* to which the current amount $I_\theta$* based on the steering angle command value θ* has been added. Thus, it is possible to execute the more appropriate control process based on the steering angle command value θ* that is a command from the host ECU 55.

If the steering angle command value θ* is not added to the steering angle θs, there is the following concern. The limiting values $I_{UL3}$*, $I_{LL3}$* based only on the steering angle θs are appropriate for the original assist control amount $I_{as}$*, but are not appropriate for the assist control amount $I_{as}$* to which the current $I_\theta$* based on the steering angle command value θ* has been added. Because the limiting values $I_{UL3}$*, $I_{LL3}$* based only on the steering angle θs are the limiting values that do not reflect the steering angle command value θ*, the limiting values $I_{UL3}$*, $I_{LL3}$* are set to values that are smaller by an amount corresponding to the current amount $I_\theta$*, for the assist control amount $I_{as}$* to which the current amount $I_\theta$* based on the steering angle command value θ* has been added. In view of executing the cooperative control, it is preferable that the assist control amount $I_{as}$* to which the current amount $I_\theta$* has been added be permitted. However, the assist control amount $I_{as}$* to which the current amount $I_\theta$* has been added may be limited by the limiting value that is smaller by an amount corresponding to current amount $I_\theta$*. Consequently, rotating the steering wheel 21 by an angle corresponding to the steering angle command value θ* may be difficult.

In this regard, according to the present embodiment, the limiting values $I_{UL3}$*, $I_{LL3}$* are set based on the steering angle θs to which the steering angle command value θ* has been added. Thus, the final limiting values $I_{UL}$*, $I_{LL}$* are set to values larger by an amount corresponding to the current amount $I_\theta$* that is added to the assist control amount $I_{as}$*. Thus, the assist control amount $I_{as}$* to which the steering angle command value θ* has been added is more likely to be permitted. Consequently, it is possible to rotate the steering wheel 21 by an angle corresponding to the steering angle command value θ*. The cooperative control with the host ECU 55 is appropriately executed.

Therefore, the fourth embodiment of the invention produces the following advantageous effects.

5) The steering-angle-sensitive limiters 93, 103 compute the appropriate limiting values $I_{UL3}$*, $I_{LL3}$* by taking into account the steering angle command value θ*. Thus, the final limiting values $I_{UL}$*, $I_{LL}$* become more appropriate values for the assist control amount $I_{as}$* to which the current amount $I_\theta$* based on the steering angle command value θ* has been added. Thus, it is possible to execute the more appropriate control process based on the steering angle command value θ* that is a command from the host ECU 55.

Note that, a command value may be provided from the ECU 56 of another in-vehicle system instead of the host ECU 55.

What is claimed is:

1. An electric power steering system comprising a control unit configured to:

i) compute an assist control amount that is a current amount, based on multiple kinds of state quantities indicating a steering state;

ii) control a motor based on the assist control amount, the motor being a source of assist force to be applied to a steering system of a vehicle;

iii) individually set, for the respective state quantities, limiting values that limit a variation range of the assist control amount, based on the respective state quantities used to compute the assist control amount;

iv) limit a value of the assist control amount using the limiting values;

v) acquire a command value generated by a host control unit to change the assist control amount;

vi) change the assist control amount using the command value before the assist control amount is limited using the limiting values; and vii) take the command value into account in setting of at least one of the limiting values.

2. The electric power steering system according to claim 1, wherein:

the command value is a torque command value;

the control unit includes a first converter configured to convert the torque command value to a current amount; and the control unit is configured to add the current amount obtained through conversion executed by the first converter, to the computed assist control amount, and configured to use a value obtained by adding the torque command value to a steering torque that is one of the multiple kinds of state quantities, when setting the limiting values based on the steering torque.

3. The electric power steering system according to claim 1, wherein, in a case where the control unit is configured to compute a basic component of the assist control amount and at least one compensation amount for the basic component and configured to compute the assist control amount by adding together the basic component and the at least one compensation amount, the command value is a gain by which the compensation amount is multiplied, and the control unit multiplies, by the gain, each of the limiting values set based on the state quantity that is used as a base for computation of the compensation amount to be multiplied by the gain.

4. The electric power steering system according to claim 1, wherein, in a case where the control unit is configured to generate each of final limiting values for the assist control amount by adding together multiple kinds of the limiting values individually set for the respective state quantities and configured to limit the value of the assist control amount using the final limiting values, the command value is an additional current command value to be added to the computed assist control amount, and the control unit adds the additional current command value to each of the final limiting values.

5. The electric power steering system according to claim 1, wherein:

the command value is a steering angle command value;

the control unit includes a second converter configured to convert the steering angle command value to a current amount; and the control unit is configured to add the current amount obtained through conversion executed by the second converter, to the computed assist control amount, and configured to use a value obtained by adding the steering angle command value to a steering angle that is one of the multiple kinds of state quantities, when setting the limiting values based on the steering angle.

* * * * *